United States Patent
Yoshiwara et al.

(10) Patent No.: US 10,634,192 B2
(45) Date of Patent: Apr. 28, 2020

(54) TAPERED ROLLER BEARING AND MANUFACTURING METHOD FOR TAPERED ROLLER BEARING

(71) Applicant: NSK LTD., Tokyo (JP)

(72) Inventors: Hidekazu Yoshiwara, Fujisawa (JP);
Hidenobu Magami, Fujisawa (JP);
Masateru Kondo, Fujisawa (JP);
Makoto Koganei, Fujisawa (JP);
Shunichi Kiyono, Fujisawa (JP)

(73) Assignee: NSK LTD., Tokyo (JP)

( * ) Notice: Subject to any disclaimer, the term of this patent is extended or adjusted under 35 U.S.C. 154(b) by 161 days.

(21) Appl. No.: 15/760,741

(22) PCT Filed: Sep. 16, 2016

(86) PCT No.: PCT/JP2016/077364
§ 371 (c)(1),
(2) Date: Mar. 16, 2018

(87) PCT Pub. No.: WO2017/047727
PCT Pub. Date: Mar. 23, 2017

(65) Prior Publication Data
US 2019/0360530 A1    Nov. 28, 2019

(30) Foreign Application Priority Data

Sep. 18, 2015  (JP) ................ 2015-185480
Nov. 25, 2015  (JP) ................ 2015-230117

(51) Int. Cl.
*F16C 33/36*    (2006.01)
*F16C 33/46*    (2006.01)
*F16C 19/36*    (2006.01)

(52) U.S. Cl.
CPC ........ *F16C 33/4682* (2013.01); *F16C 19/364* (2013.01); *F16C 33/4635* (2013.01)

(58) Field of Classification Search
CPC ............... F16C 19/364; F16C 33/4635; F16C 33/4676; F16C 33/4682
See application file for complete search history.

(56) References Cited

U.S. PATENT DOCUMENTS 4,812,058 A * 3/1989 Hofmann .............. F16C 19/364
384/563
2003/0142893 A1  7/2003 Joki et al.
(Continued)

FOREIGN PATENT DOCUMENTS

JP   2006-46465 A    2/2006
JP   2007032679 A    2/2007
(Continued)

OTHER PUBLICATIONS

International Search Report, issued by International Searching Authority in corresponding International Application No. PCT/JP2016/077364, dated Nov. 8, 2016, (PCT/ISA/210).
(Continued)

*Primary Examiner* — Phillip A Johnson
(74) *Attorney, Agent, or Firm* — Sughrue Mion, PLLC

(57) ABSTRACT

In a tapered roller bearing, neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets, and constitute a second engagement allowance in which an outer diameter-side opening width of each of the pockets becomes smaller than the roller diameter at a position of the opening width in the direction at at least a part of an outer diameter side of each of the pockets. Bumps are formed on an inner surface of the small diameter ring part in
(Continued)

the pockets. Small diameter-side end faces of the tapered rollers facing the bumps are substantially flat surfaces.

18 Claims, 14 Drawing Sheets

(56) References Cited

U.S. PATENT DOCUMENTS

| | | | |
|---|---|---|---|
| 2007/0047865 A1 | 3/2007 | Nakamizo et al. | |
| 2014/0221150 A1* | 8/2014 | Nakagawa | F16C 33/56 475/348 |
| 2015/0323008 A1 | 11/2015 | Koganei et al. | |
| 2016/0040716 A1 | 2/2016 | Koganei et al. | |
| 2017/0204906 A1 | 7/2017 | Koganei et al. | |
| 2017/0227052 A1 | 8/2017 | Koganei et al. | |

FOREIGN PATENT DOCUMENTS

| | | | |
|---|---|---|---|
| JP | 2007-127269 A | 5/2007 | |
| JP | 2007-263304 A | 10/2007 | |
| JP | 2007-292305 A | 11/2007 | |
| JP | 2008-121743 A | 5/2008 | |
| JP | 2008-281036 A | 11/2008 | |
| JP | 2009-97601 A | 5/2009 | |
| JP | 2010112473 A * | 5/2010 | ......... F16C 33/4682 |
| JP | 2013-68281 A | 4/2013 | |
| JP | 2014-202284 A | 10/2014 | |
| JP | 2015-102137 A | 6/2015 | |
| WO | WO-2014104132 A1 * | 7/2014 | ............ F16C 19/364 |
| WO | 2014/163177 A1 | 10/2014 | |
| WO | 2015/129709 A1 | 9/2015 | |

OTHER PUBLICATIONS

Written Opinion, issued by International Searching Authority in corresponding International Application No. PCT/JP2016/077364, dated Nov. 8, 2016, (PCT/ISA/237).

Communication dated Sep. 6, 2016, from the Japanese Patent Office in counterpart application No. 2016-010618.

Communication dated Sep. 20, 2018, from the European Patent Office in counterpart European Application No. 16846598.7.

* cited by examiner

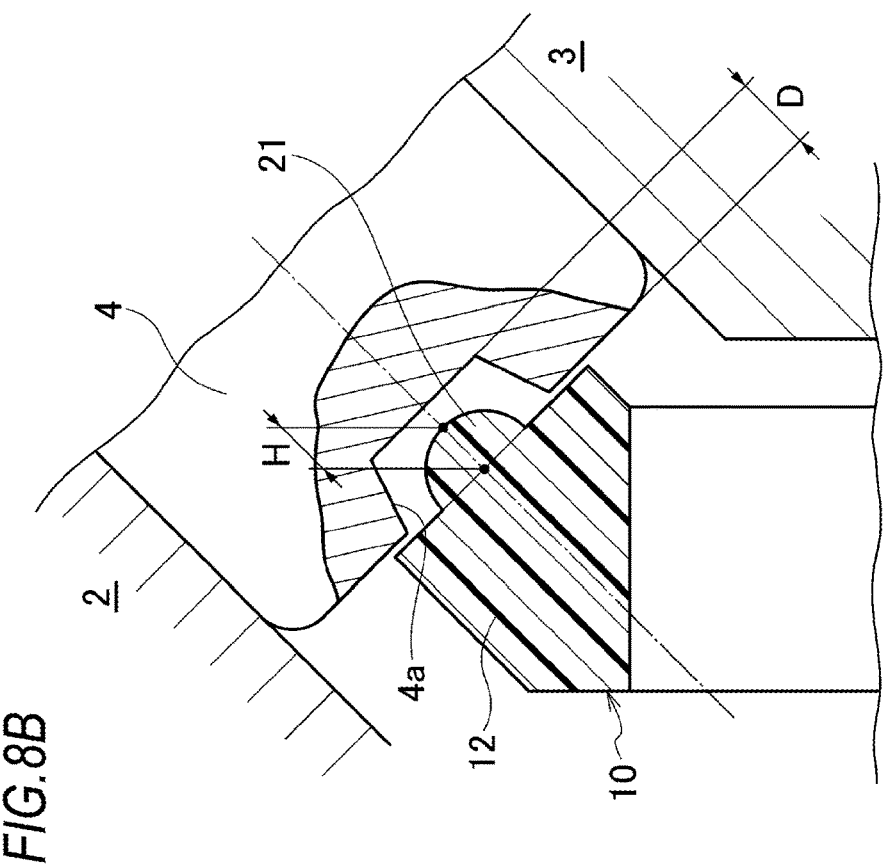
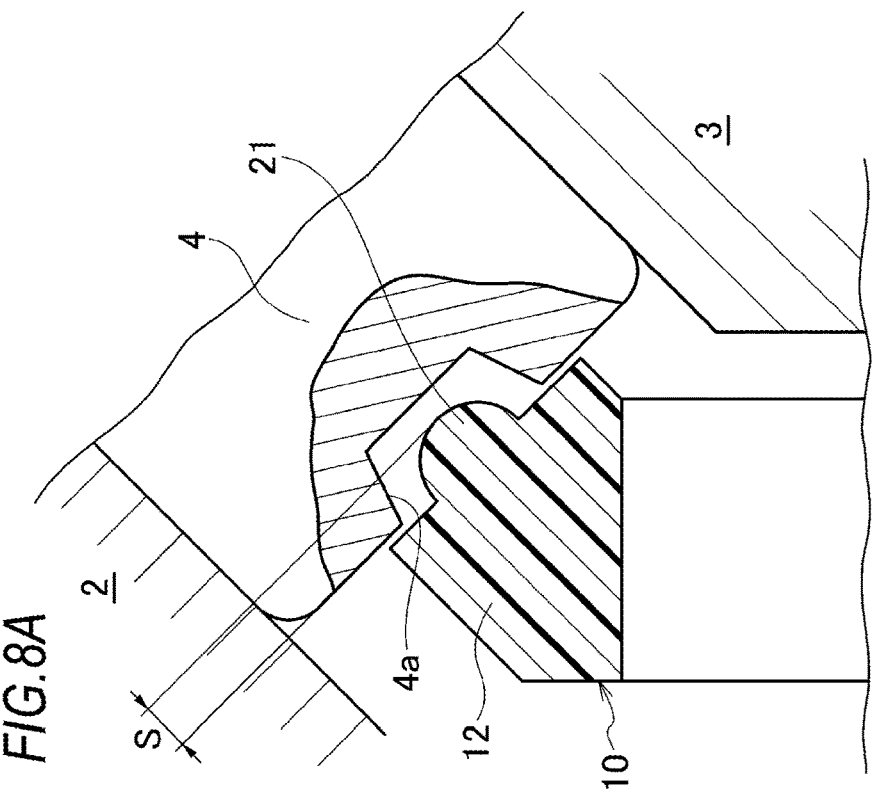

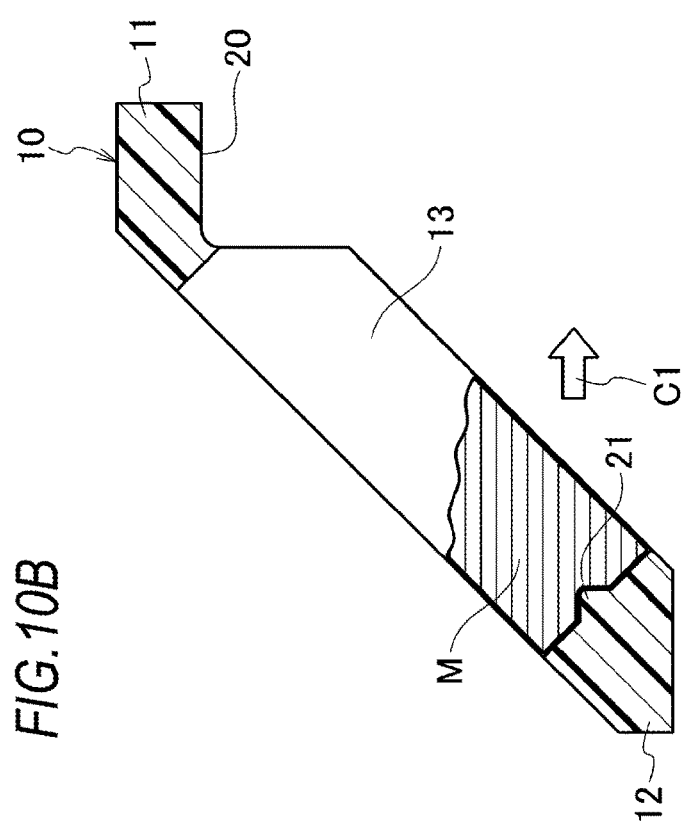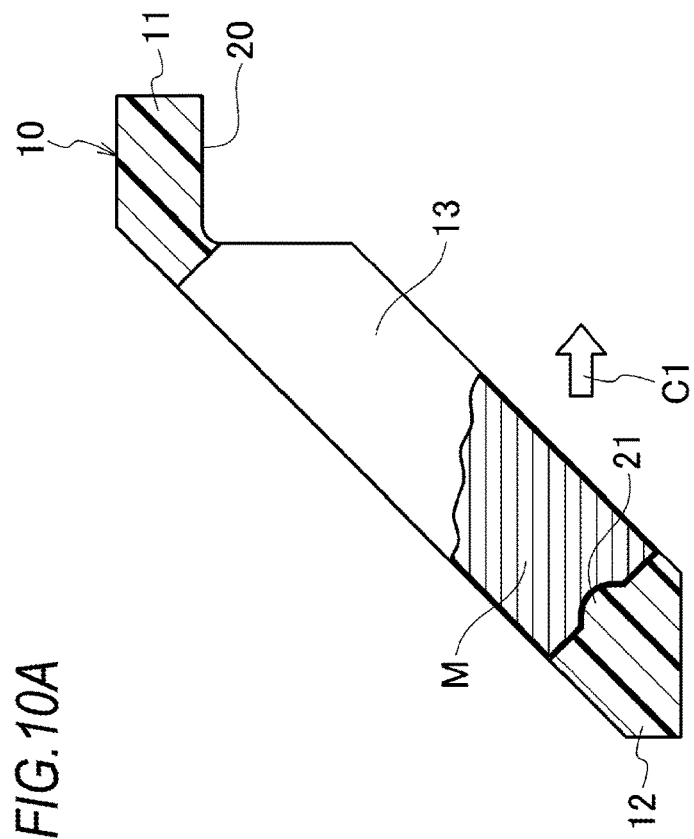

TAPERED ROLLER BEARING AND MANUFACTURING METHOD FOR TAPERED ROLLER BEARING

TECHNICAL FIELD

The present invention relates to a tapered roller bearing and a method of manufacturing the same, and particularly to a tapered roller bearing that includes a cage manufactured by injection-molding a thermoplastic resin and can be appropriately used for rotary supports of various mechanical apparatuses, and a method of manufacturing the same.

BACKGROUND ART

Roller bearings have a greater loading capability of a radial load than ball bearings, and tapered roller bearings in which truncated conical rollers (tapered rollers) as rolling elements are incorporated can support a combined load of a radial load and an axial (thrust) load. For this reason, the tapered roller bearings are widely used for rotary supports of various mechanical apparatuses (e.g., see Patent Document 1).

As cages used for the tapered roller bearings, metal cages formed by press-molding a steel sheet or resin cages formed by injection-molding a thermoplastic resin filled with a reinforcement such as glass fiber or carbon fiber are used. Especially, the resin cages have an advantage of having lightness and mass-productivity, an advantage of not generating worn metal powder or the like, and so on, and thus are widely used. The resin cages are often injection-molded using a metal mold structure in which a pair of metal molds are separated in an axial direction, that is, an axial draw type mold in order to cut down manufacturing costs (e.g., see Paragraph [0011] and FIG. 11 of Patent Document 1).

In the cages injection-molded by this axial draw type mold, since the cage generally has a shape in which, on the basis of each mold parting line inside each pocket which is made to be a boundary, one side is generally in contact with a tapered roller and the other is not in contact with the tapered roller, the tapered roller can be inserted from an inner diameter side, and does not fall off from an outer diameter side but falls off from the inner diameter side.

Therefore, since the tapered roller falls off with the cage and the tapered roller alone, productivity of the tapered roller bearing is lowered depending on a configuration of an assembly line.

As illustrated in FIG. 16, in a resin cage 110 for a tapered roller bearing set forth in Patent Document 2, a mold parting plane A extending in an axial direction is formed at a pillar part 113 of the cage 110. Inner diameter-side conical surfaces 115A are formed closer to inner diameter-side portions than a virtual conical plane C connecting rotation axes of a plurality of rollers 104 on an outer diameter side from the mold parting plane A on facing surfaces of neighboring pillar parts 113, and radial planes 116A are formed closer to outer diameter-side portions than the virtual conical plane C. In addition, outer diameter-side conical surfaces 115B are formed closer to the outer diameter-side portions than the virtual conical plane C on an inner diameter side from the mold parting plane A, and radial planes 116B are formed closer to the inner diameter-side portions than the virtual conical plane C. Thereby, a tapered roller 104 is retained on both the outer diameter side and the inner diameter side of the mold parting plane A while performing injection molding by an axial draw type mold, and falling of the tapered roller 104 is prevented.

RELATED ART REFERENCE

Patent Document

Patent Document 1: JP-A-2007-127269
Patent Document 2: JP-A-2014-202284

SUMMARY OF THE INVENTION

Problems to be Solved by the Invention

Meanwhile, in the resin cage 110 for the tapered roller bearing of Patent Document 2, engagement allowances for the tapered roller 104 are configured at only diagonal positions of large and small diameter sides of each pillar part 113 in each pocket of the cage 110. For this reason, an engagement amount for rotation of the roller 104 in a tilt direction (a direction of an arrow B) is determined by a value of cage pocket gap of the roller 104 in a lengthwise direction, a contact area between the end face of the roller and the cage, and a diameter dimension of the roller. During assembly of the bearing, after the rollers 104 and the cage 110 are merely assembled, as illustrated in FIG. 16, if the rollers 104 and the cage 110 are arranged with a small diameter-side annular part 112 of the cage 110 directed upward and with a large diameter-side annular part 111 directed downward, the roller 104 has a tendency toward rotation in the tilt direction due to a dead load. Therefore, when the cage pocket gap in the lengthwise direction of the roller is great, a small diameter-side tail of the roller 104 after roller is incorporated rotates in the tilt direction. if so, a problem that the roller 104 falls off occurs.

When the cage pocket gap in the lengthwise direction of the roller is constant, the engagement amount for the rotation of the roller 104 in the tilt direction can be sufficiently secured in a bearing having a specification in which the roller diameter is great and the bearing size is great. However, in a bearing having a specification in which the roller diameter is small and the bearing size is small, the engagement amount cannot be sufficiently secured, and a case in which the roller 104 falls off occurs.

Therefore, as described above, when the roller 104 and the cage 110 are arranged in a specified direction, it is necessary to carefully treat the bearing during the assembly in a situation in which the roller is easily falls off. As a result, workability during the assembly is poor, and according to circumstances, there occurs a problem with waste of a manufacturing process or loss of the roller when falling off.

The present invention was made in view of the above circumstances, and an object thereof is to provide a tapered roller bearing capable of reliably preventing falling of tapered rollers from a cage.

Means for Solving the Problems

The object of the present invention is accomplished by the following configurations.

(1) A tapered roller bearing includes:
an outer ring having an outer ring raceway surface on an inner circumferential surface thereof;
an inner ring having an inner ring raceway surface on an outer circumferential surface thereof;

a plurality of tapered rollers that are rollingly arranged between the outer ring raceway surface and the inner ring raceway surface; and a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers, the inner ring including a large diameter-side end and a small diameter-side end, and only the large diameter-side end being formed with a flange part, wherein each of the pillar parts includes a first protrusion that retains each of the tapered rollers on an inner diameter side of each of the pockets and a second protrusion that retains each of the tapered rollers on an outer diameter side of each of the pockets, bumps are formed on only an inner surface of the small diameter ring part in the pockets, and end faces of the tapered rollers facing the bumps are substantially flat surfaces or recesses.

(2) A tapered roller bearing includes:

an outer ring having an outer ring raceway surface on an inner circumferential surface thereof;

an inner ring having an inner ring raceway surface on an outer circumferential surface thereof;

a plurality of tapered rollers that are rollingly arranged between the outer ring raceway surface and the inner ring raceway surface; and a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers, the inner ring including a large diameter-side end and a small diameter-side end, and only the large diameter-side end being formed with a flange part, wherein the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets, the neighboring pillar parts constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets, bumps are formed on an inner surface of the small diameter ring part in the pockets, and end faces of the tapered rollers facing the bumps are substantially flat surfaces.

(3) A tapered roller bearing includes:

an outer ring having an outer ring raceway surface on an inner circumferential surface thereof;

an inner ring having an inner ring raceway surface on an outer circumferential surface thereof;

a plurality of tapered rollers that are rollingly arranged between the outer ring raceway surface and the inner ring raceway surface; and a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers, the inner ring including a large diameter-side end and a small diameter-side end, and only the large diameter-side end being formed with a flange part, wherein the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets, the neighboring pillar parts constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets, recesses are formed in small diameter-side end faces of the tapered rollers, and bumps protruding to enter the recesses are formed in an inner surface of the small diameter ring part in the pockets.

(4) The tapered roller bearing according to any one of (1) to (3) is characterized in that apexes of the bumps are provided closer to inner diameter-side openings of the pockets than positions through which the rotation axes of the tapered roller pass on the inner surface of the small diameter ring part.

(5) The tapered roller bearing according to (1) or (4) is characterized in that the first and second protrusions are arranged at positions at which the protrusions do not overlap each other in the axial direction.

(6) The tapered roller bearing according to any one of (2) to (4) is characterized in that at least a part of each of the pillar parts that constitute the first engagement allowance on the inner diameter side of each of the pockets and at least a part of each of the pillar parts that constitute the second engagement allowance on the outer diameter side of each of the pockets are arranged at positions that do not overlap each other in the axial direction.

(7) The tapered roller bearing according to any one of (1), (4), and (5) is characterized in that:

mold parting lines extending in the axial direction are formed at each of the pillar parts having the pockets; and the first protrusion is disposed on an outer diameter side with respect to each of the mold parting lines, and the second protrusion is disposed on an inner diameter side with respect to each of the mold parting lines.

(8) The tapered roller bearing according to any one of (1) to (7) is characterized in that:

mold parting lines extending in the axial direction are formed at each of the pillar parts having the pockets; and first conical surfaces that are in sliding contact with the outer circumferential surface of each of the tapered rollers are formed closer to outer diameter sides than the mold parting lines on facing surfaces of the neighboring pillar parts, and substantially flat surfaces that are continuous with the first conical surfaces in a first radial direction are formed closer to outer diameter-side portions than the first conical surfaces; and second conical surfaces that are in sliding contact with the outer circumferential surface of each of the tapered rollers are formed closer to inner diameter sides than the mold parting lines, and substantially flat surface that are continuous with the second conical surfaces in a second radial direction are formed closer to inner diameter-side portions than the second conical surfaces.

(9) The tapered roller bearing according to any one of (2) to (4) and (6) is characterized in that at least a part of each of the pillar parts that constitute the first engagement allowance on the inner diameter side of each of the pockets and at least a part of each of the pillar parts that constitute the second engagement allowance on the outer diameter side of each of the pockets have tapered shapes.

(10) The tapered roller bearing according to any one of (1) to (9) is characterized in that:

each of the bumps has a conical shape or a spherical shape; and each of the bumps is formed such that, out of the inner surface of the small diameter ring part, the inner surface other than the bump does not overlap the bump when viewed in the axial direction.

(11) The tapered roller bearing according to any one of (1) to (10) is characterized in that the cage has a ring-like cutout part formed on at least one of an inner circumferential surface of the large diameter ring part and an outer circumferential surface of the small diameter ring part such that a thickness of the ring part is thinner than thicknesses of the pillar parts.

The expression "the substantially flat surfaces in the radial direction" of (8) above are not limited to the flat surfaces extending in the radial direction or the flat surfaces along which the facing surfaces are parallel to each other, and may be flat surfaces directed in the radial direction within a range in which a metal mold can be released in an axial direction.

Advantages of the Invention

According to the tapered roller bearing related to the first invention of the present invention, each of the pillar parts includes a first protrusion that retains each of the tapered rollers on an inner diameter side of each of the pockets and a second protrusion that retains each of the tapered rollers on an outer diameter side of each of the pockets, bumps are formed on only an inner surface of the small diameter ring part in the pockets, and end faces of the tapered rollers facing the bumps are substantially flat surfaces or recesses.

Thereby, when the bearing is assembled by arranging the tapered rollers and the cage in a specified direction, that is, the cage in which the tapered rollers are incorporated are arranged with the small diameter ring part thereof directed upward and the large diameter ring part thereof directed downward, rotation of small diameter-side tails of the tapered rollers in a tilt direction can be inhibited. Thus, falling of the tapered rollers from the cage can be reliably prevented, and an optimal cage and roller structure is obtained. In the tapered roller bearing related to the first invention of the present invention, especially in a case in which a contact angle is great (e.g., 35° or more), an effect of restraining the falling of the tapered rollers is remarkable.

According to the tapered roller bearing related to the second invention of the present invention, the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets, and constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets, bumps are formed on an inner surface of the small diameter ring part in the pockets, and end faces of the tapered rollers facing the bumps are substantially flat surfaces.

Thereby, when the bearing is assembled by arranging the tapered rollers and the cage in a specified direction, that is, the cage in which the tapered rollers are incorporated are arranged with the small diameter ring part thereof directed upward and the large diameter ring part thereof directed downward, rotation of small diameter-side tails of the tapered rollers in a tilt direction can be inhibited. Thus, falling of the tapered rollers from the cage can be reliably prevented, and an optimal cage and roller structure is obtained. In the tapered roller bearing related to the second invention of the present invention, especially in a case in which a contact angle is great (e.g., 35° or more), an effect of restraining the falling of the tapered rollers is remarkable. Further, in the tapered roller bearing related to the second invention of the present invention, since the end faces of the tapered rollers facing the bumps are the substantially flat surfaces, production costs can be reduced because a process of recessing the end faces of the tapered rollers is not especially added.

According to the tapered roller bearing related to the third invention of the present invention, the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets, and constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets, recesses are formed in small diameter-side end faces of the tapered rollers, and bumps protruding to enter the recesses are formed in an inner surface of the small diameter ring part in the pockets.

Thereby, when the bearing is assembled by arranging the tapered rollers and the cage in a specified direction, that is, the cage in which the tapered rollers are incorporated are arranged with the small diameter ring part thereof directed upward and the large diameter ring part thereof directed downward, rotation of small diameter-side tails of the tapered rollers in a tilt direction can be inhibited. Thus, falling of the tapered rollers from the cage can be reliably prevented, and an optimal cage and roller structure is obtained. In the tapered roller bearing related to the third invention of the present invention, especially in a case in which a contact angle is great (e.g., 35° or more), an effect of restraining the falling of the tapered rollers is remarkable.

BRIEF DESCRIPTION OF THE DRAWINGS

FIGS. 8A and 8B are enlarged views illustrating key parts around a small diameter side of a tapered roller of the tapered roller bearing of FIG. 7.

FIG. 10A is a sectional view illustrating a cage for a tapered roller bearing according to a modification of the second embodiment of the present invention, and FIG. 10B is a sectional view illustrating a cage for a tapered roller bearing according to another modification of the second embodiment of the present invention.

MODES FOR CARRYING OUT THE INVENTION

Hereinafter, a tapered roller bearing according to each embodiment of the present invention will be described in detail on the basis of the drawings.

First Embodiment

Figure 1A:
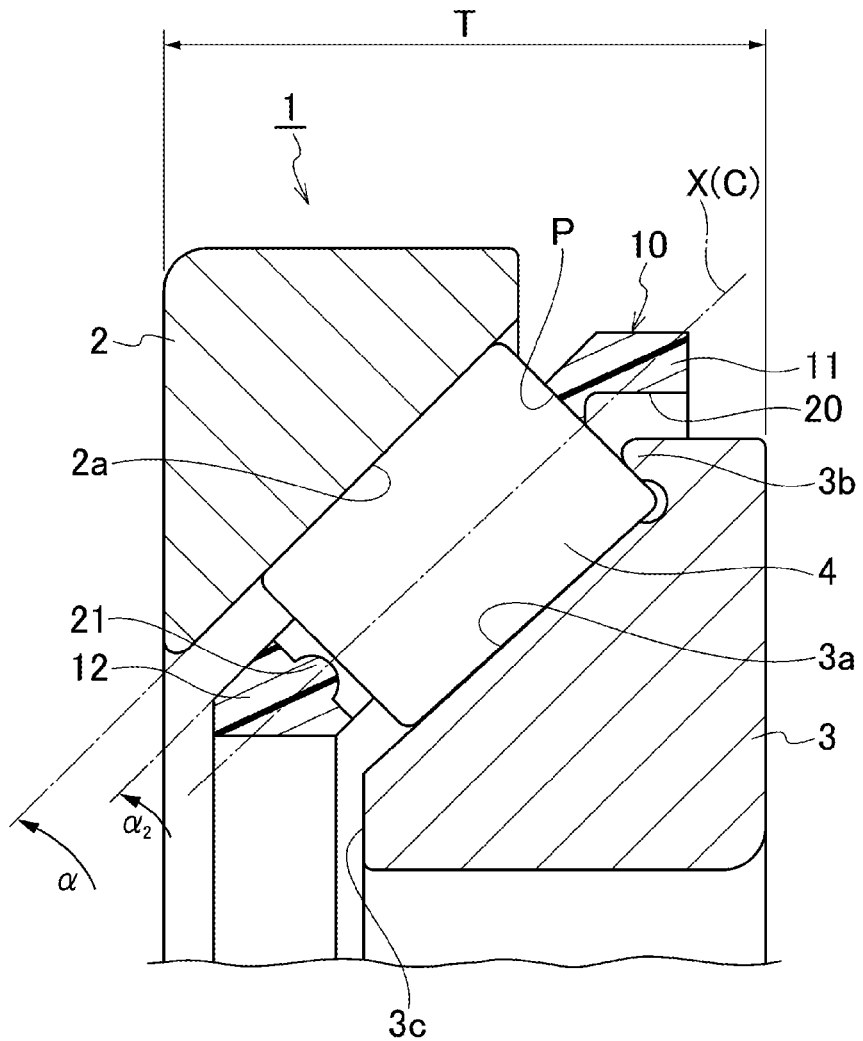
FIG. 1A is a sectional view illustrating a tapered roller bearing according to a first embodiment of the present invention.
Figure 1B:
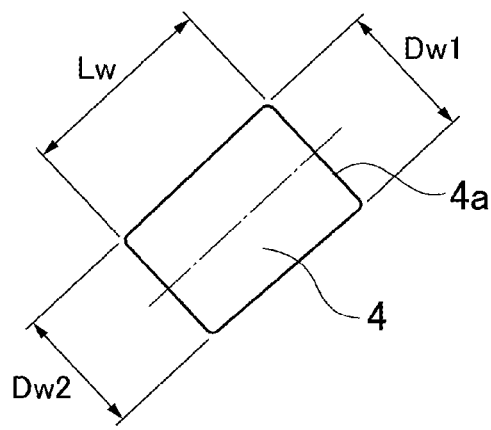
FIG. 1B is a view illustrating a tapered roller.

As illustrated in FIGS. 1A and 1B, a tapered roller bearing 1 of the present embodiment has an outer ring 2 that has an outer ring raceway surface 2a on an inner circumferential surface thereof, an inner ring 3 that has an inner ring raceway surface 3a on an outer circumferential surface thereof, a plurality of tapered rollers 4 that are rollingly arranged between the outer ring raceway surface 2a and the inner ring raceway surface 3a, and a resin cage 10 that houses and retains the plurality of tapered rollers 4 at predetermined intervals.

The outer ring raceway surface 2a formed on the outer ring 2 is provided on the inner circumferential surface of the outer ring 2 such that an inner diameter is gradually increased from a small diameter side to a large diameter side.

The inner ring 3 includes a large flange 3b that is formed at a large diameter-side end to protrude outward in a radial direction, and the inner ring raceway surface 3a continues to a small diameter-side end face 3c, and is provided such that an outer diameter is gradually increased from the small diameter-side end face 3c to the large flange 3b. That is, the inner ring 3 has a flange part at only one of a large diameter-side end and a small diameter-side end, i.e., at the large diameter-side end. The inner ring 3 is not provided with a small flange, so that a roller length Lw can be made longer, and a load capacity can be increased to improve moment rigidity and to have a long lifespan.

As illustrated in FIGS. 1A and 1B, in the tapered roller bearing 1 of the present embodiment, a contact angle α that is an angle between a tangential line of the outer ring raceway surface 2a and a rotational axis of the tapered roller bearing 1 is set to 45°, and the moment rigidity is improved.

The contact angle α ranges from 35° to 55°, so that the moment rigidity can be improved. When a pair of tapered roller bearings 1 are arranged in an axial direction and are used, in a case in which an inter-bearing distance is short, and particularly is equal to or less than four time an assembly width T of the bearing, if the contact angle α ranges from 35° to 55°, this can increase an inter-load center distance, and is especially useful in improving the moment rigidity of the bearing.

The tapered roller bearing 1 of the present embodiment is suitable for a size in which a bearing inner diameter is 30 to 500 mm and a bearing outer diameter is 33 to 650 mm.

Figure 2:
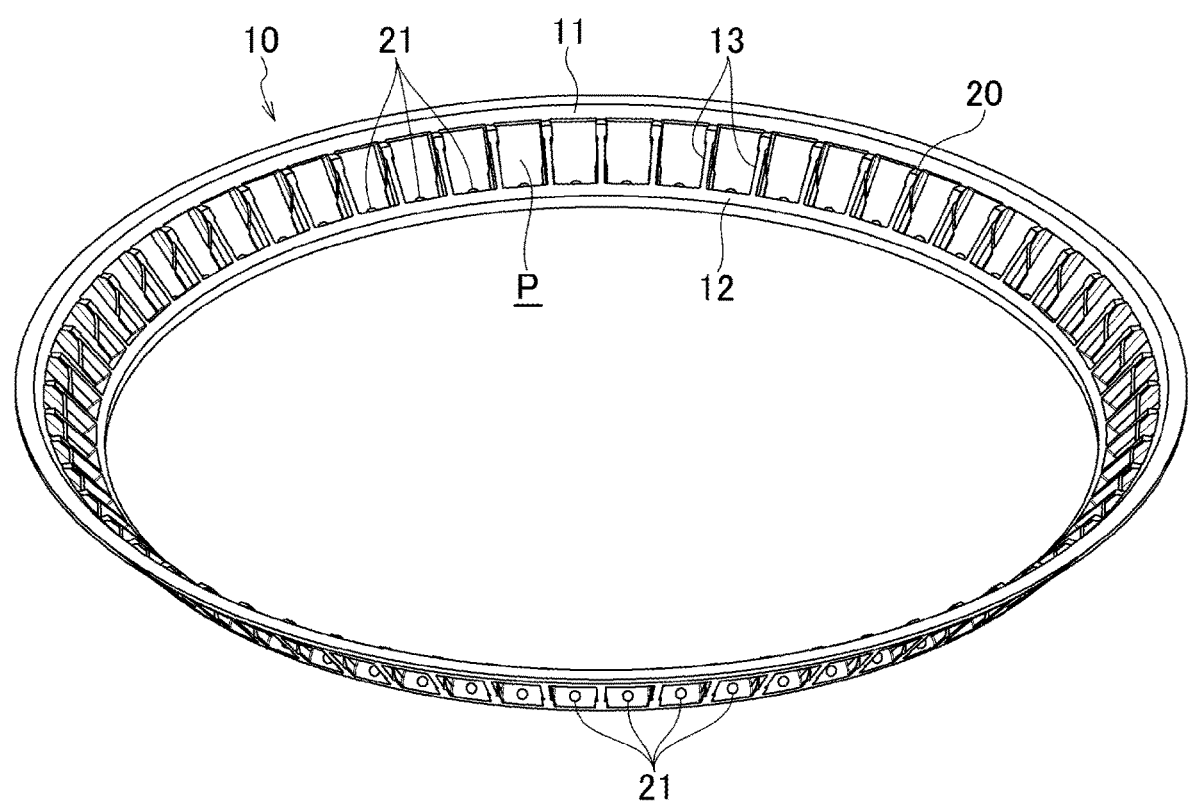
FIG. 2 is a perspective view of a resin cage for the tapered roller bearing of FIG. 1A.

As illustrated in FIG. 2, the resin cage 10 includes a large diameter ring part 11 and a small diameter ring part 12 that are separated in an axial direction, and a plurality of pillar parts 13 that connect the large diameter ring part 11 and the small diameter ring part 12 and are provided at predetermined intervals in a circumferential direction. The pillar parts 13 is in sliding contact with outer circumferential surfaces of the tapered rollers 4 that are rolling elements. A plurality of pockets P, P, . . . for housing and retaining the tapered rollers 4, 4, . . . are evenly formed in the resin cage 10 in a circumferential direction.

A thermoplastic resin having heat resistance of a certain level or higher can be used as a base resin used for a resin composition that can be used in the cage 10.

To satisfy fatigue resistance and a low dimensional change by water absorption which are required as the cage 10, the base resin is preferably a crystalline resin, and particularly polyamide 46, polyamide 66, an aromatic polyamide resin, a polyphenylene sulfide (PPS) resin, a polyether ether ketone (PEEK) resin, or the like. Modified polyamide 6T such as polyamide 6T/6I, polyamide MXD6, polyamide 9T, and polyamide 4T can be used as the aromatic polyamide resin. Among the base resins described above, the polyphenylene sulfide (PPS) resin and the polyether ether ketone (PEEK) resin that have almost no dimensional change by water absorption are especially suitable.

This resin composition contains a reinforced fiber material in order to achieve strength of a certain level or higher and inhibit a linear expansion coefficient and a dimensional change by water absorption. As the reinforced fiber material, a surface treated product (surface-treated with a silane coupling agent or a sizing agent, so that adhesiveness to the base resin is improved) such as a glass fiber, a carbon fiber, or an aramid fiber can be preferably used.

A content of the reinforced fiber material in the resin composition is not less than 10 wt % and not more than 40 wt % on the basis of the total resin composition, and more preferably 15 to 30 wt %.

The resin cage 10 is manufactured by injection molding, and is injection-molded by an axial draw type mold advantageous in cost in the present embodiment.

Figure 3A:
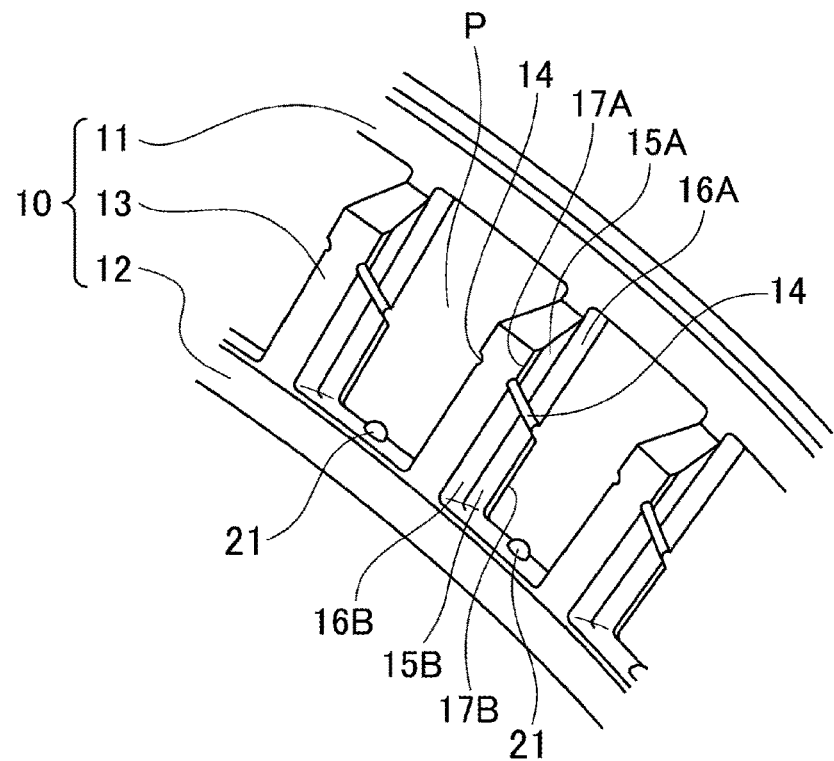
FIG. 3A is an enlarged perspective view illustrating key parts of the resin cage for the tapered roller bearing of FIG. 2.
Figure 3B:
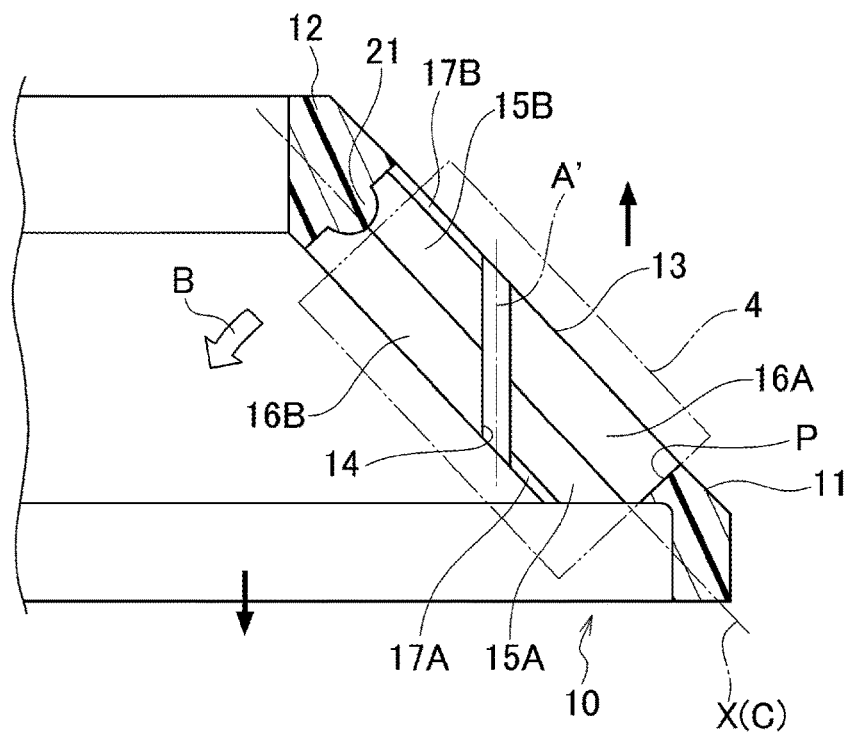
FIG. 3B is an enlarged sectional view illustrating key parts of the resin cage.

As illustrated in FIGS. 3A and 3B, since midsections of the pillar parts 13, 13, . . . , which have the pockets P, P, . . . , in a radial direction are used as mold parting lines, that is, parting lines A', the pockets P, P, . . . are formed by combining a stationary side cavity and a movable side cavity.

As illustrated in FIGS. 3A and 3B, inner diameter-side conical surfaces 15A that are in sliding contact with the outer circumferential surface of each of the tapered rollers 4 are formed closer to inner diameter-side portions than a virtual conical plane C, which connects rotation axes X (central axes) of the plurality of tapered rollers 4, 4, . . . , on outer diameter sides from the mold parting lines A' on facing surfaces of the neighboring pillar parts 13 and 13, and radial planes 16A continuous with the inner diameter-side conical surfaces 15A are formed closer to outer diameter-side portions than the virtual conical plane C. In addition, outer diameter-side conical surfaces 15B that are in sliding contact with the outer circumferential surface of each of the tapered rollers 4 are formed closer to the outer diameter-side portions than the virtual conical plane C on inner diameter sides from the mold parting lines A' on the facing surfaces of the neighboring pillar parts 13 and 13, and radial planes 16B continuous with the outer diameter-side conical surfaces 15B are formed closer to the inner diameter-side portions than the virtual conical plane C.

Curvatures of the conical surfaces 15A and 15B are set to be slightly larger than a curvature of each of the tapered rollers 4.

Figure 5A:
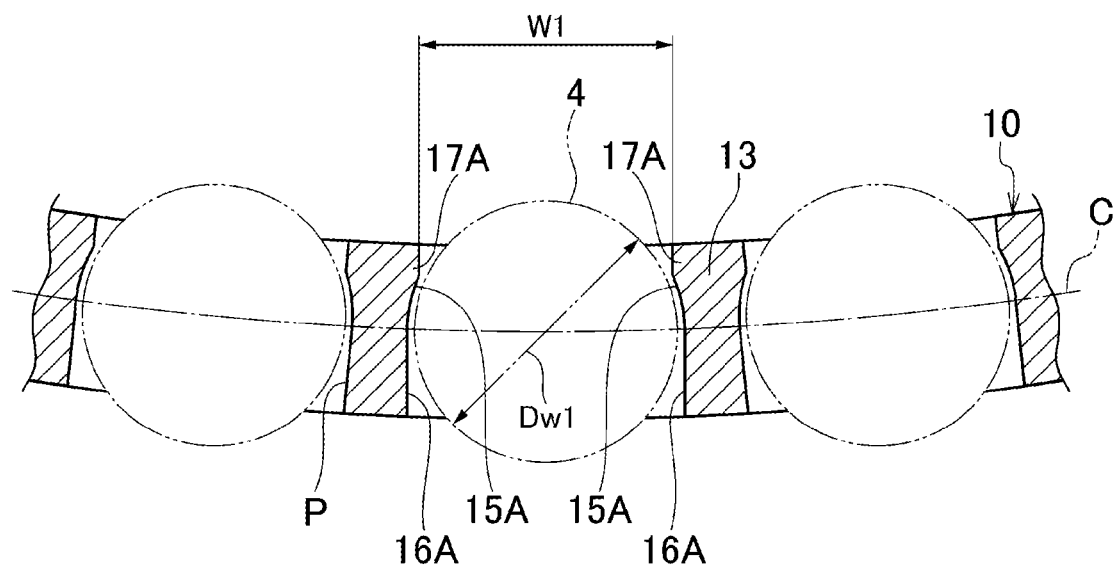
FIG. 5A is a sectional view cut along the line perpendicular to the rotation axis of the tapered roller on a large diameter side of the cage.
Figure 5B:
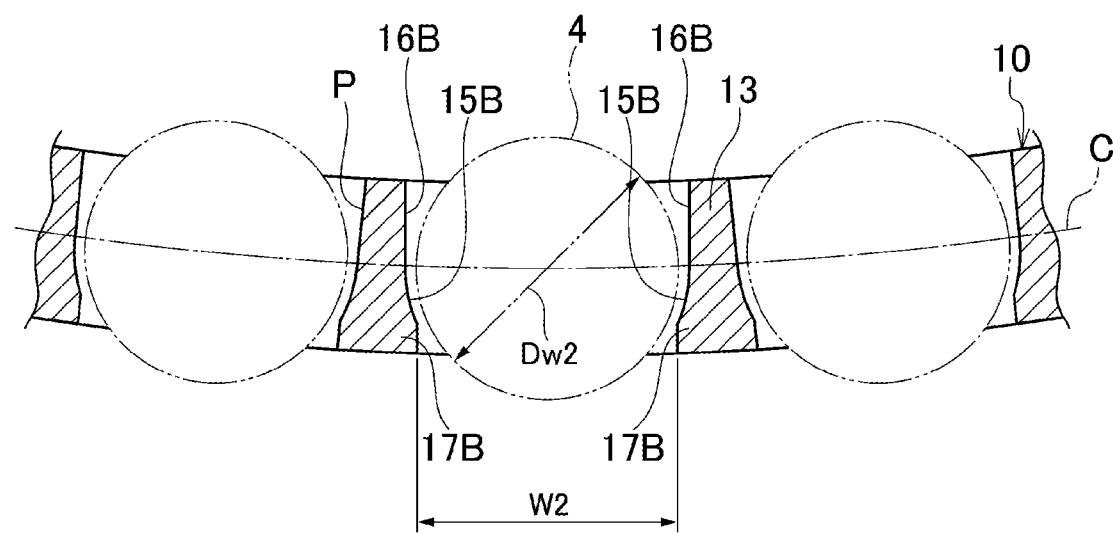
FIG. 5B is a sectional view cut along the line perpendicular to the rotation axis of the tapered roller on a small diameter side of the cage.

As illustrated in FIG. 5A as well, protrusions 17A are provided at ends of the inner diameter-side conical surfaces 15A that are formed at portions closer to the large diameter ring part of each of the pillar parts 13, and as illustrated in FIG. 5B, protrusions 17B are provided at ends of the outer diameter-side conical surfaces 15B that are formed at portions closer to the small diameter ring part of each of the pillar parts 13.

That is, in the present embodiment, each of the pillar parts 13 includes the protrusions 17A constituting a first protrusion that retains each of the tapered rollers 4 at an inner diameter side of each of the pockets P, and the protrusions 17B constituting a second protrusion that retains each of the tapered rollers 4 at an outer diameter side of each of the pockets P.

Since the tapered rollers 4 and the resin cage 10 are integrated, an inner diameter-side opening width W1 of each pocket has a smaller dimension than a roller large diameter Dw1 at the protrusions 17A closer to the large diameter ring part of each of the pillar parts 13, and an outer diameter-side opening width W2 of each pocket has a smaller dimension than a roller small diameter Dw2 at the protrusions 17B closer to the small diameter ring part of each of the pillar parts 13.

That is, in the present embodiment as well, the neighboring pillar parts 13 constitutes a second engagement allowance in which the outer diameter-side opening width W2 of each of the pockets P becomes smaller than a roller diameter at a position of the opening width W2 in a direction of the rotation axis X of each of the tapered rollers 4 on the outer diameter side of each of the pockets P by means of the protrusions 17B closer to the small diameter ring part. In addition, the neighboring pillar parts 13 constitutes a first engagement allowance in which the inner diameter-side opening width W1 of each of the pockets P becomes smaller than a roller diameter at a position of the opening width W1 in the direction of the rotation axis X of each of the tapered rollers 4 on the inner diameter side of each of the pockets P by means of the protrusions 17A closer to the large diameter ring part.

Here, the first engagement allowance (Dw1-W1) at the protrusions 17A closer to the large diameter ring part of each of the pillar parts 13 is preferably set to 0.1 mm to 0.7 mm, and the second engagement allowance (Dw2-W2) at the protrusions 17B closer to the small diameter ring part of each of the pillar parts 13 is preferably set to 0.1 mm to 0.6 mm. Especially, in terms of an excellent balance between roller insertability and roller retainability, the first engagement allowance (Dw1-W1) at the protrusions 17A closer to the large diameter ring part of each of the pillar parts 13 is more preferably set to 0.2 mm to 0.6 mm, and the second engagement allowance (Dw2-W2) at the protrusions 17B closer to the small diameter ring part of each of the pillar parts 13 is more preferably set to 0.1 mm to 0.3 mm.

Further, recessed grooves 14 and 14 running along the mold parting lines A' are formed in the facing surfaces of the neighboring pillar parts 13 and 13. Depths of the recessed grooves 14 and 14 are designed to be 0.1 to 0.8 mm. When the depths of the recessed grooves 14 and 14 are less than 0.1 mm, burrs bu may protrude to a pocket surface to obstruct smooth rotation of each of the tapered rollers 4. Meanwhile, when the depths of the recessed grooves 14 and 14 exceed 0.8 mm, thicknesses of the pillar parts 13 and 13 may be reduced, and strength may be reduced.

As illustrated in FIGS. 1A to 2, bumps 21 are formed on an inner surface of the small diameter ring part 12 in the pockets P. Meanwhile, the small diameter-side end faces of the tapered rollers 4 which face the bumps 21 are formed to be a substantially flat surface.

Apexes of the bumps 21 are located on the rotation axes X of the tapered rollers 4, but they may be offset and located from the rotation axes X of the tapered rollers 4.

Figure 4A:
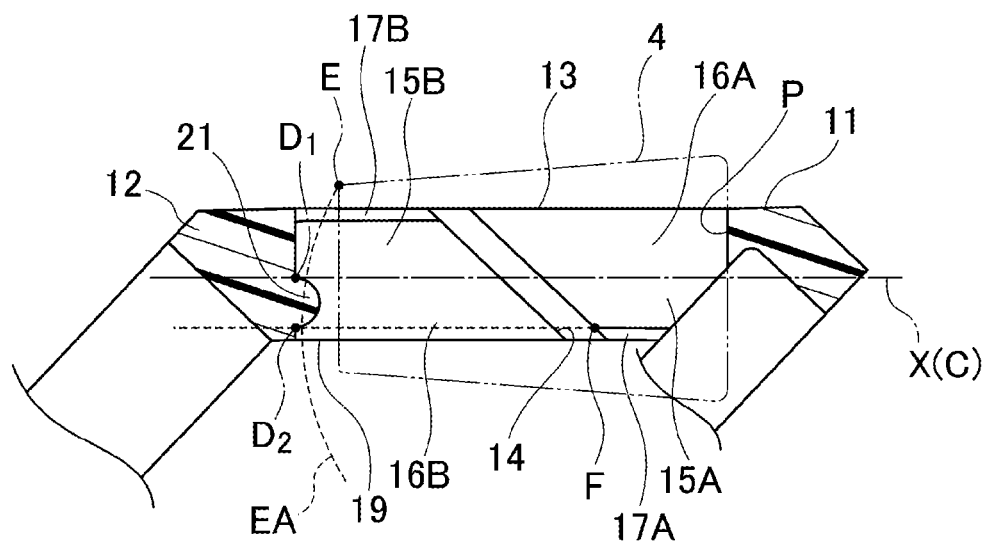
FIG. 4A is a sectional view for illustrating a preferred position of a bump.
Figure 4B:
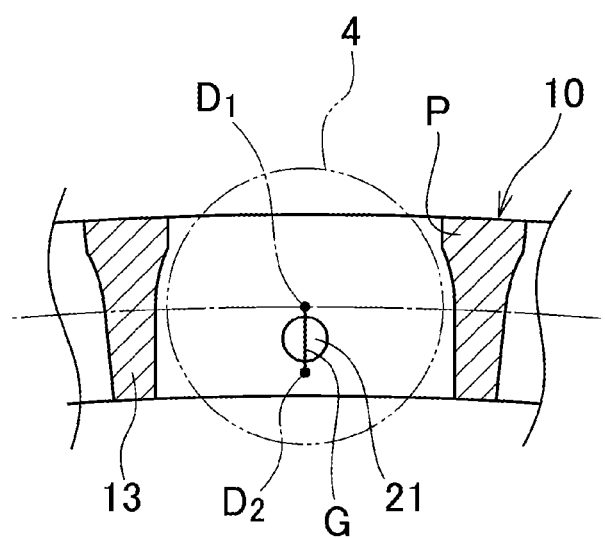
FIG. 4B is a sectional view cut along a line perpendicular to a rotation axis of the tapered roller.

As illustrated in FIGS. 4A and 4B, if the bump 21 is provided at an intersection D1 with the rotation axis X (the central axis) of the tapered roller 4 on the inner surface of the small diameter ring part 12, when the bearing rotates, torque is small because the bump 21 does not obstruct a rotation motion of the tapered roller 4. When an intersection E between the small diameter-side end face of the roller and the outer circumferential surface of the roller approaches the inner surface of the small diameter ring part 12 of the cage first when the tapered roller falls off, if the bump 21 is provided at a facing position D2 of the small diameter ring part 12 which faces the intersection E in the direction of the rotation axis, an effect of preventing falling when the tapered roller 4 falls off from the cage 10 is most excellent. The intersection E rotates about an apex F of a ridgeline of the first engagement allowance (that is, an apex at which a ridgeline between the protrusion 17A and the inner diameter-side conical surface 15A intersects the recessed groove 14).

Therefore, as a result of considering both rotation and assembly of the bearing, the apex of the bump 21 is preferably provided closer to an inner diameter-side opening 19 of the pocket P than a position through which the rotation axis X of the tapered roller 4 passes on the inner surface of the small diameter ring part 12. Further, the apex of the bump 21 is more preferably provided between the intersection D1 and the facing position D2 facing the intersection E (that is, on a straight line G connected between D1 and D2) on the inner surface of the small diameter ring part of the cage.

Further, a size of the bump 21 is also designed in consideration of both the rotation and the assembly of the bearing. That is, as illustrated in FIG. 3B, a height of the bump 21 in the direction of the rotation axis X is designed such that the tapered roller 4 rotates in a state in which the tapered roller 4 is retained in the cage 10 and intersects a locus EA (see FIG. 4A) drawn by edges (the intersection E) of the small diameter-side end face of the roller and the outer circumferential surface of the roller. In addition, the height of the bump 21 in the direction of the rotation axis X is designed such that a predetermined pocket gap is secured between the bump 21 and the small diameter-side end face of the tapered roller 4.

A shape of the bump 21 formed in the cage 10 is also preferably a conical shape or a spherical shape formed by a metal mold when the cage is injection-molded by an axial draw type mold.

According to this configuration, the conical surfaces 15A and 15B that are in sliding contact with the outer circumferential surface of each of the tapered rollers 4, and the radial planes 16A and 16B are divided to the outer diameter side and the inner diameter side from the mold parting line A', and are alternately formed on the facing surface of each of the neighboring pillar parts 13 and 13, each of the tapered rollers 4 is retained by the conical surface 15A located at the outer diameter side from the mold parting line A' and the conical surface 15B located at the inner diameter side, and thus the retainment is possible with the tapered rollers 4, 4, . . . embraced in a state in which the tapered rollers 4 are not incorporated between the inner and outer rings of the tapered roller bearing.

In each of the pockets P, the bump 21 is formed on the inner surface of the small diameter ring part 12, and the small diameter-side end face of each of the tapered rollers 4 is formed to be a substantially flat surface. For this reason, when the bearing 1 is assembled by arranging the tapered rollers 4 and the cage 10 in a specified direction, that is, the cage 10 in which the tapered rollers 4 are incorporated as illustrated in FIG. 3B are arranged with the small diameter ring part 12 thereof directed upward and the large diameter ring part 11 thereof directed downward, the bumps 21 and small diameter-side tails of the tapered rollers 4 can be brought into contact with each other, and the protrusions 17A on the large diameter ring side enter a state in which they can retain large diameter-side heads of the tapered rollers 4. Thereby, since rotation of the small diameter-side tails of the tapered rollers 4 in a tilt direction can be inhibited, the falling of the tapered rollers 4 from the cage 10 can be reliably prevented, and an optimal cage and roller structure is obtained.

Accordingly, due to this cage and rollers, for example, assembly can be easily performed by an automatic machine, and the assembly of the tapered roller bearing is facilitated.

Since the conical surfaces 15A and 15B that are in sliding contact with the outer circumferential surface of each of the tapered rollers 4, and the radial planes 16A and 16B are divided to the outer diameter side and the inner diameter side from the mold parting line A', and are alternately formed on the facing surface of each of the neighboring pillar parts 13 and 13, a metal mold can be released in an axial direction, and the cage can be injection-molded by an axial draw type mold.

Accordingly, since the metal mold does not become complicated and expensive, the manufacturing costs of the resin cage 10 for the tapered roller bearing are not increased.

As illustrated in FIG. 3B or 4A, the protrusion 17A constituting the first protrusion and the protrusion 17B constituting the second protrusion are also disposed not to overlap each other in an axial direction. Especially, in the present embodiment, the first protrusion is disposed on the outer diameter side with respect to the mold parting line A', and the second protrusion is disposed on the inner diameter side with respect to the mold parting line A'.

In the case of the present embodiment, at least a part of each of the pillar parts 13 that constitute the first engagement allowance on the inner diameter side of each of the pockets P and at least a part of each of the pillar parts 13 that constitute the second engagement allowance on the outer diameter side of each of the pockets P are also disposed at positions at which they do not overlap each other in an axial direction.

Accordingly, despite a configuration having the first and second protrusions and the first and second engagement allowances, a metal mold can be released in an axial direction.

Further, since the recessed grooves 14, 14, . . . , each of which runs along the mold parting line A', are formed in the pillar parts 13, 13, . . . having the pockets P, P, . . . , even when the burrs occur due to the mold parting lines A' inside the pockets P, the burrs that have such sizes as to stay inside the recessed grooves 14 do not interfere with the tapered rollers 4, and thus the burrs that have such sizes as to stay inside the recessed grooves 14 can be accepted.

Accordingly, a risk of the burrs falling off from the cage 10 during the rotation of the tapered roller bearing to damage the tapered rollers and the raceway surfaces of the inner and outer rings and a risk of obstructing the smooth rotation of the tapered rollers 4 can be considerably reduced.

The mold parting lines A' are formed in the midsections of the pillar parts 13 in a radial direction such that the inner diameter-side conical surfaces 15A and the outer diameter-side conical surfaces 15B are equalized in lengths of the pillar parts 13 in an extending direction. Thereby, the falling of the tapered rollers 4 to the inner diameter side and the outer diameter side can be reliably prevented by the inner diameter-side conical surfaces 15A and the outer diameter-side conical surfaces 15B.

The mold parting lines A' are preferably the midsections of the pillar parts 13 in the radial direction. However, as long as the falling of the tapered rollers 4 can be prevented by the inner diameter-side conical surfaces 15A and the outer diameter-side conical surfaces 15B, the mold parting lines A' may be formed around the midsections of the pillar parts 13 in the radial direction, that is, slight shift from the midsections in the radial direction to the inner diameter side or the outer diameter side.

As illustrated in FIGS. 1A and 1B, a ring-like cutout part 20 is formed in an inner circumferential surface of the large diameter ring part 11 such that a wall thickness of the large diameter ring part 11 is thinner than those of the pillar parts 13. An inner circumferential surface of the cage 10 is formed from the pillar parts 13 to the large diameter ring part 11 in a stepped shape. The cutout part 20 cuts out a part of each of the pillar parts 13 in a radial direction. Thereby, since the wall thickness of the large diameter ring part 11 becomes thin, an elastic deformation amount of the pillar parts 13 close to the large diameter ring part is increased, and the tapered rollers 4 are easily inserted from the inside of the cage 10.

The large flange 3b of the inner ring 3 can enter the ring-like cutout part 20, and the large flange 3b is enlarged as much, so that application of the axial load can be increased. Further, since the cutout part 20 cuts out a part of each of the pillar parts 13 in the radial direction, interference with the large flange 3b can be avoided.

In the embodiment, the ring-like cutout part 20 is formed in the inner circumferential surface of the large diameter ring part 11, but the ring-like cutout part may be formed in at least one of the inner circumferential surface of the large diameter ring part 11 and an outer circumferential surface of the small diameter ring part 12. For example, the ring-like cutout part may be formed in both the inner circumferential surface of the large diameter ring part 11 and the outer circumferential surface of the small diameter ring part 12, and the tapered rollers 4 may be easily inserted from both sides of the cage 10.

A tilt angle α2 of the outer circumferential surface of the cage 10 with respect to the rotation axis of the tapered roller bearing 1 is set to not less than 32°30' and less than 55° corresponding to the contact angle α of the tapered roller bearing 1, and preferably to not less than 32°30' and not more than 54°.

As described above, according to the tapered roller bearing 1 of the present embodiment, the neighboring pillar parts 13 constitute the first engagement allowance in which the inner diameter-side opening width of each of the pockets P becomes smaller than the roller diameter at the position of the opening width in the direction of the rotation axis X of each of the tapered rollers 4 at at least a part of the inner diameter side of each of the pockets P, and constitute the second engagement allowance in which the outer diameter-side opening width of each of the pockets P becomes smaller than the roller diameter at the position of the opening width in the direction of the rotation axis X of each of the tapered rollers 4 at at least a part of the outer diameter side of each of the pockets P. The bumps 21 are formed on the inner surface of the small diameter ring part 12 in the pockets P, and the small diameter-side end faces of the tapered rollers 4 are formed to be a substantially flat surface. Thereby, the tapered roller bearing 1 of the present embodiment can reliably prevent the falling of the tapered rollers 4 from the cage 10 with a simple configuration in which the bumps 21 are provided on the cage 10, in addition to the configuration in which the tapered rollers 4 are retained on the outer and inner diameter sides of the pockets P.

Since the apexes of the bumps 21 are provided closer to the inner diameter-side openings 19 of the pockets P than the positions, through which the rotation axes X of the tapered rollers 4 pass, on the inner surface of the small diameter ring part 12, the falling of the tapered rollers 4 from the cage 10 during assembly can be prevented while suppressing the heights of the bumps 21.

Since the conical surfaces 15A and 15B, which are in sliding contact with the outer circumferential surface of each of the tapered rollers 4, and the radial planes 16A and 16B are divided to the outer diameter side and the inner diameter side from the mold parting line A', and are alternately formed on the facing surface of each of the neighboring pillar parts 13, each of the tapered rollers 4 is retained by the conical surface 15A located at the outer diameter side from the mold parting line A' and the conical surface 15B located at the inner diameter side, and thus the retainment is possible with the tapered rollers 4 embraced in the state in which the tapered rollers 4 are not incorporated between the inner and outer rings of the tapered roller bearing 1. Accordingly, due to this cage and rollers, for example, the assembly can be easily performed by an automatic machine, and the assembly of the tapered roller bearing is facilitated.

According to the present embodiment, since the conical surfaces 15A and 15B, which are in sliding contact with the outer circumferential surface of each of the tapered rollers 4, and the radial planes 16A and 16B are divided to the outer diameter side and the inner diameter side from the mold parting line A', and are alternately formed on the facing surface of each of the neighboring pillar parts 13, a pair of metal molds can be released in an axial direction, and the large diameter ring part 11, the small diameter ring part 12, and the pillar parts 13 can be injection-molded by an axial draw type mold. Accordingly, since the metal molds do not become complicated and expensive, the manufacturing costs of the resin cage 10 for the tapered roller bearing are not increased.

The cage 10 of the present embodiment is not limited to the injection molding by the axial draw type mold using the pair of metal molds, and may be injection-molded using an insert and a core in part.

Since the recessed grooves 14, each of which runs along the mold parting line A', are formed in the facing surfaces of the pillar parts 13, even when the burrs occur due to the mold parting lines A' inside the pockets P, the burrs that have such sizes as to stay inside the recessed grooves 14 do not interfere with the tapered rollers 4, and thus the burrs that have such sizes as to stay inside the recessed grooves 14 can be accepted. Accordingly, the risk of the burrs falling off from the cage 10 during the rotation of the tapered roller bearing to damage the tapered rollers 4 and the raceway surfaces of the inner and outer rings and the risk of obstructing the smooth rotation of the tapered rollers 4 can be considerably reduced.

The mold parting lines A' are formed in the midsections of the pillar parts 13 in the radial direction such that the inner diameter-side conical surfaces 15A and the outer diameter-side conical surfaces 15B are equalized in the lengths of the pillar parts 13 in the extending direction. Thereby, the falling of the tapered rollers 4 to the inner diameter side and the outer diameter side can be reliably prevented by the inner diameter-side conical surfaces 15A and the outer diameter-side conical surfaces 15B.

Further, the neighboring pillar parts 13 constitute an engagement allowance of 0.1 mm to 0.7 mm at the protrusions 17A close to the large diameter ring part, and are formed such that the inner diameter-side opening width W1 of each of the pockets P is smaller than the roller large diameter Dw1 of each of the tapered rollers 4, and constitute an engagement allowance of 0.1 mm to 0.6 mm at the protrusions 17B close to the small diameter ring part, and are formed such that the outer diameter-side opening width W2 of each of the pockets P is smaller than the roller small diameter Dw2 of each of the tapered rollers 4. Thereby, the insertability and retainability of the tapered rollers 4 into and in the cage 10 can be improved.

That is, the neighboring pillar parts 13 may constitute an engagement allowance of 0.1 mm to 0.7 mm at at least a part of the inner diameter side of each of the pockets P, and be formed such that the inner diameter-side opening width W1 of each of the pockets P is smaller than the roller large diameter Dw1 of each of the tapered rollers 4, and may constitute an engagement allowance of 0.1 mm to 0.6 mm at at least a part of the outer diameter side of each of the pockets P, and be formed such that the outer diameter-side opening width W2 of each of the pockets P is smaller than the roller small diameter Dw2 of each of the tapered rollers 4.

Since the tilt angle α2 of the cage 10 is set to not less than 32°30' and less than 55°, the cage 10 can also be applied to the tapered roller bearing 1 having a sharp gradient in which a contact angle α ranges from 35° to 55°.

Further, in the tapered roller bearing 1, the small flange for the inner ring is eliminated to realize high moment rigidity and a long lifespan, so that the roller length is prolonged to that extent. To cope with this, the present embodiment sets the engagement allowances for the cage 10, thereby improving roller retaining performance of the cage 10 and realizing integration of the tapered rollers 4 and the cage 10. Thus, the cage 10 adopted for the tapered roller bearing 1 of the present embodiment realizes a function as the small flange for the inner ring instead of the small flange for the inner ring which fundamentally serves to retain the tapered rollers 4, and can effectively inhibit the roller's falling of the tapered roller bearing 1 having the sharp gradient in which the contact angle ranges from 35° to 55°.

Figure 6:
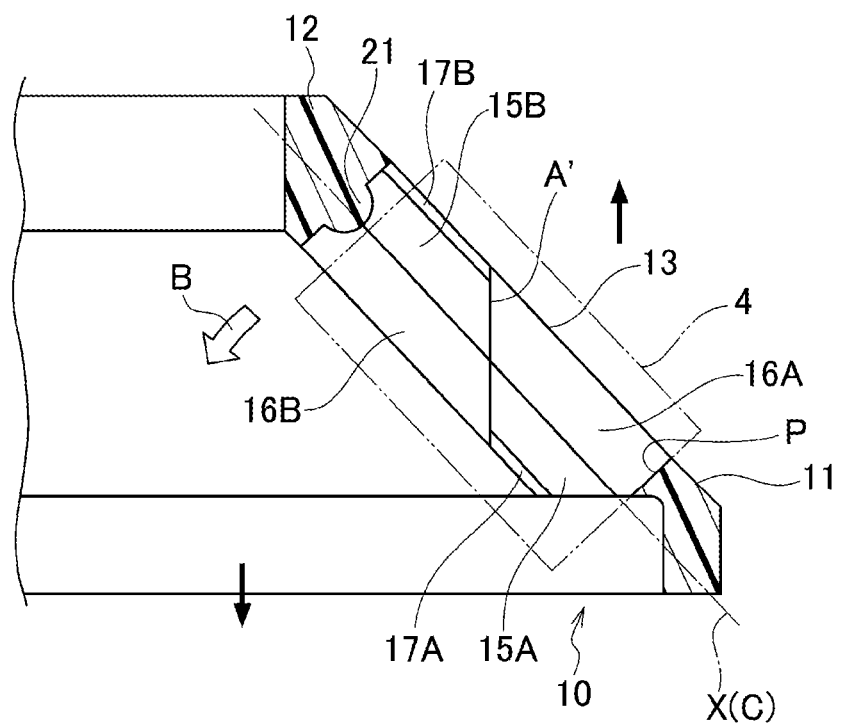
FIG. 6 is an enlarged sectional view illustrating key parts of a resin cage for a tapered roller bearing according to a modification of the first embodiment of the present invention.

In the embodiment, the recessed grooves 14 are formed along the mold parting lines A'. However, since the recessed grooves 14 are responsible for reducing the strengths of the pillar parts 13, the recessed grooves 14 are preferably formed as small as possible. For example, like a modification illustrated in FIG. 6, in the cage 10, the mold parting line A' may be configured without the recessed groove as in the embodiment.

In the embodiment, the end faces of the tapered rollers 4 which face the bumps 21 may be a substantially flat surface, and they may be a flat surface and a curved surface having a small curvature.

Second Embodiment

Figure 7:
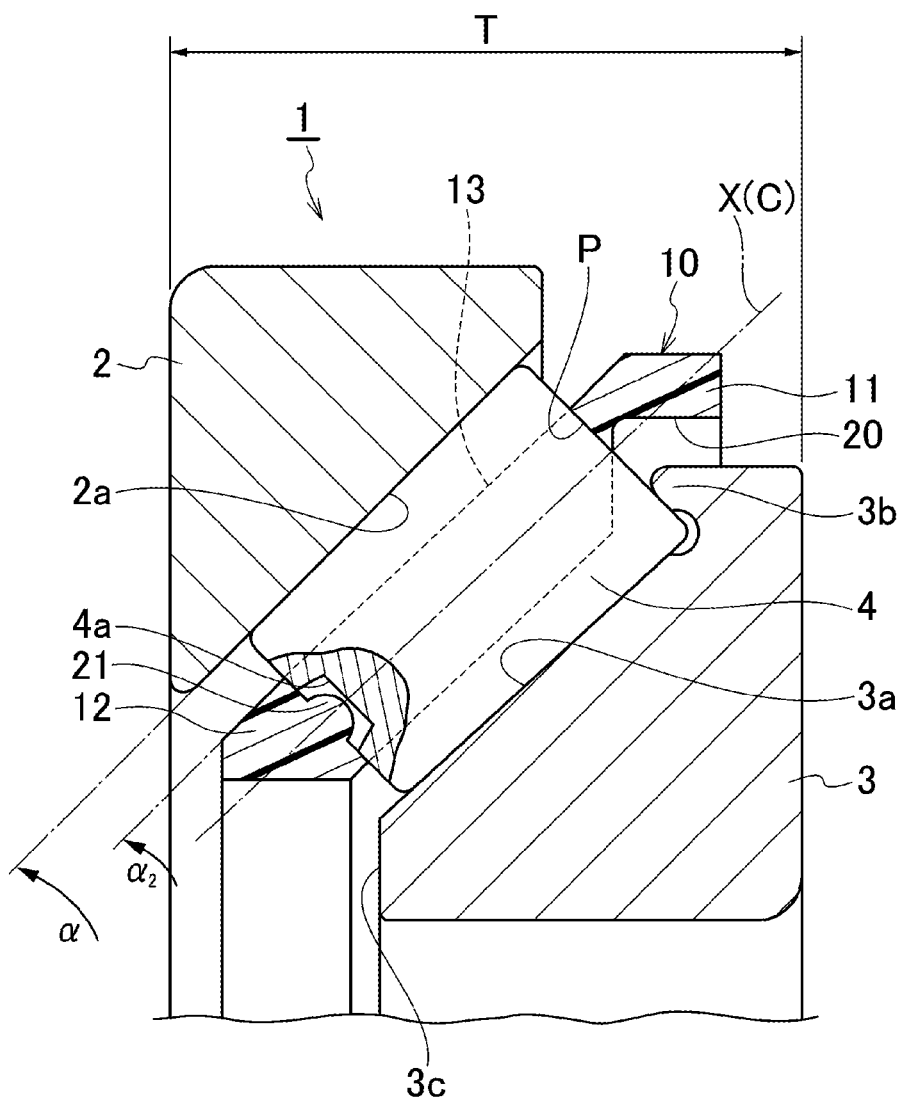
FIG. 7 is a sectional view of a tapered roller bearing according to a second embodiment of the present invention.

Next, a tapered roller bearing according to a second embodiment of the present invention will be described in detail with reference to FIGS. 7 to 9. Portions identical or equivalent to those of the first embodiment will be given identical reference signs, and description thereof will be omitted or simplified.

Figure 9:
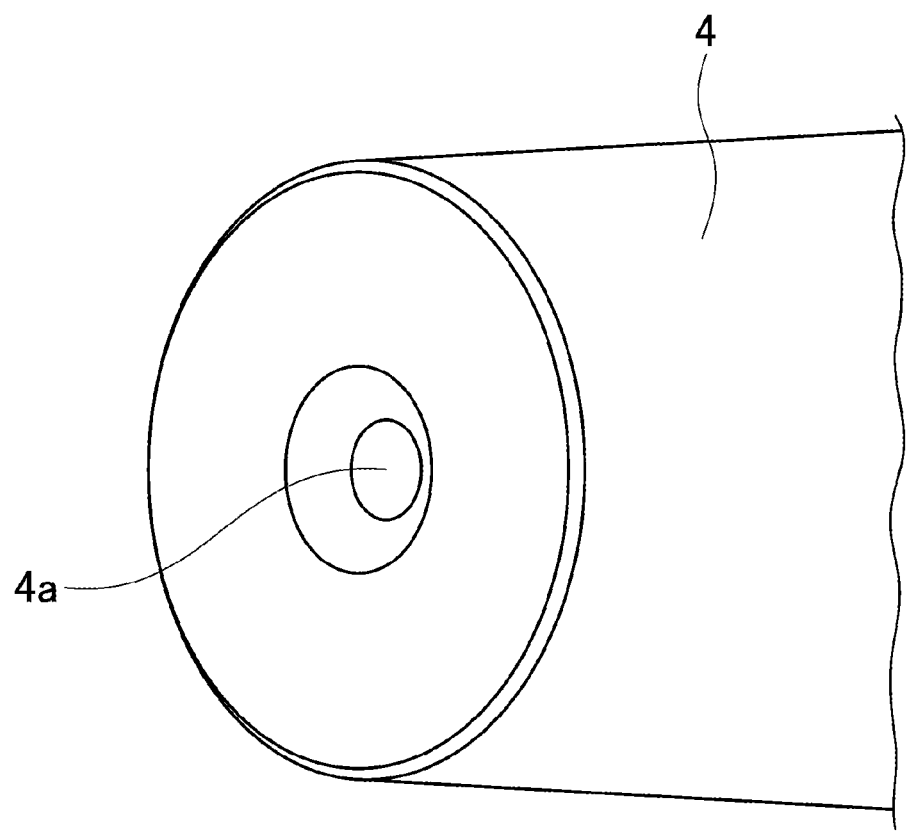
FIG. 9 is a perspective view of the tapered roller bearing of FIG. 7 when viewed from the small diameter side.

In the present embodiment, as illustrated in FIGS. 8A to 9, recesses 4a are formed in the small diameter-side end faces of the tapered rollers 4, and spherical bumps 21 protruding to enter the recesses 4a are formed in the inner surface of the small diameter ring part 12 having the pockets P.

The apexes of the bumps 21 are located on the rotation axes X of the tapered rollers 4, and each of the recesses 4 is made up of a circular bottom, and a tapered lateral surface that is tapered from an opening side.

The apex of each of the bumps 21 may be located with it offset from the rotation axis X of each of the tapered rollers 4.

As illustrated in FIG. 8A, an engagement amount S between the recess 4a of the tapered roller 4 and the bump 21 of the cage 10 in the direction of the rotation axis X of the tapered roller 4 is set to 1.0 mm or less in consideration of incorporatability of the tapered roller 4 into the cage 10.

Further, as illustrated in FIG. 8B, a depth D of the recess 4a of the tapered roller 4 is designed to be greater than a height H of the bump 21 of the cage 10 (D>H). This is to set a dimensional relation in which the bump 21 does not restrain the tapered roller 4 after the tapered roller is incorporated into the cage 10.

The tapered lateral surface of the recess 4a of the tapered roller 4 is designed in a size in which the tapered roller 4 does not interfere with the bump 21 when moving into the pocket P.

In addition, like a modification illustrated in FIG. 10A, the spherical bump 21 is preferably formed in a shape in which undercut does not occur when a metal mold M is released, that is, when the metal mold M is pulled out in an axial direction (an arrow C1) when the cage 10 is injection-molded by an axial draw type mold. To be specific, the bump 21 is formed such that, a part of an inner surface on which the bump 21 is formed, i.e. an inner surface other than the bump 21, does not overlap the bump 21 when viewed in an axial direction.

Like another modification illustrated in FIG. 10B, the bump 21 may be formed in a conical shape. In this case, the conical bump 21 is also formed such that, a part of an inner surface on which the bump 21 is formed, i.e. an inner surface other than the bump 21, does not overlap the bump 21 when viewed in an axial direction.

As described above, according to the tapered roller bearing 1 of the present embodiment, the neighboring pillar parts 13 constitute the first engagement allowance in which the inner diameter-side opening width of the pocket P becomes smaller than the roller diameter at the position of the opening width in the direction of the rotation axis X of the tapered roller 4 at at least a part of the inner diameter side of the pocket P, and constitute the second engagement allowance in which the outer diameter-side opening width of the pocket P becomes smaller than the roller diameter at the position of the opening width in the direction of the rotation axis X of the tapered roller 4 at at least a part of the outer diameter side of the pocket P. The recess 4a is formed in the small diameter-side end face of the tapered roller 4, and the bump 21 protruding to enter the recess 4a is formed on the inner surface of the small diameter ring part 12 having the pocket P. Thereby, the tapered roller bearing 1 of the present embodiment can reliably prevent the falling of the tapered roller 4 from the cage 10 with a simple configuration in which the recess 4a is provided in the tapered roller 4 and the bump 21 is provided on the cage 10, in addition to the configuration in which the tapered roller 4 is retained on the outer and inner diameter sides of the pocket P.

In the tapered roller bearing of the present embodiment, especially, when a bearing size is small, an effect of preventing the falling of the tapered roller can be effectively obtained.

Third Embodiment

Next, a tapered roller bearing according to a third embodiment of the present invention will be described in detail with reference to FIG. 11. Portions identical or equivalent to those of the second embodiment will be given identical reference signs, and description thereof will be omitted or simplified.

Figure 11:
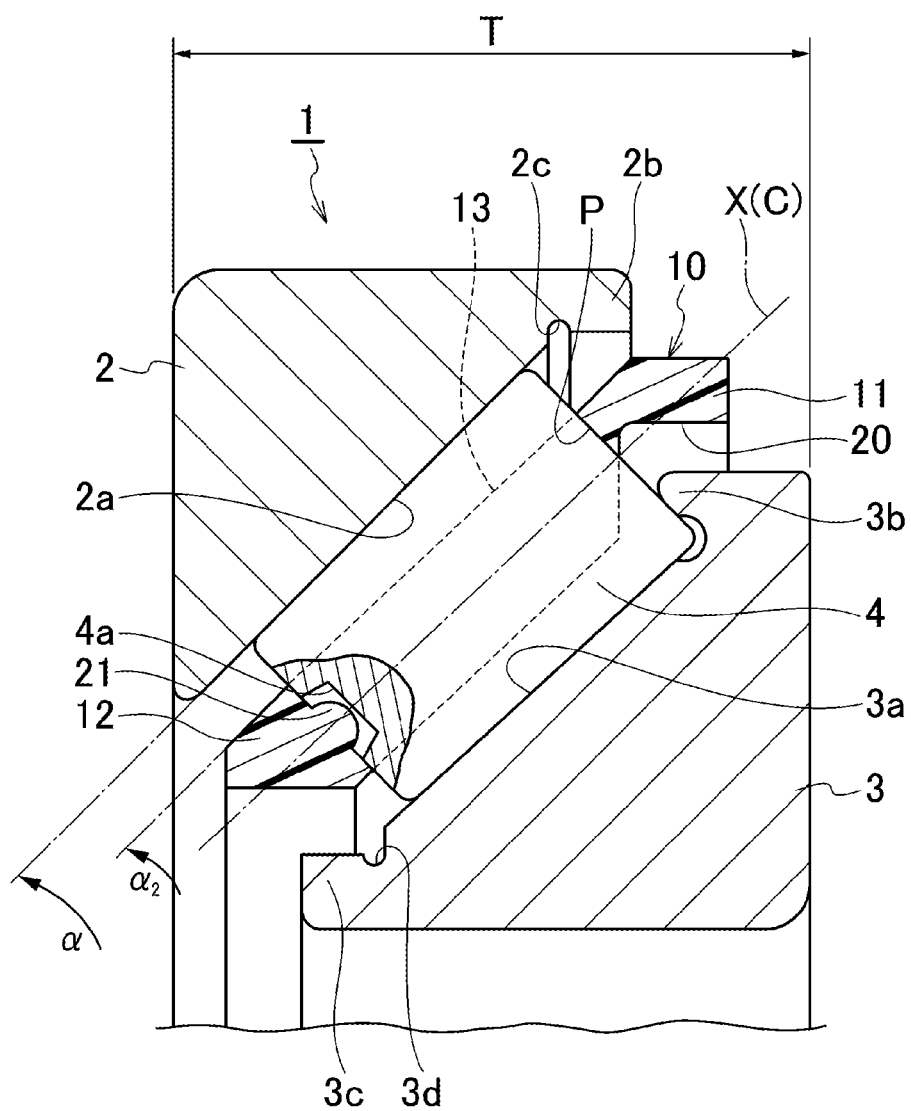
FIG. 11 is a sectional view of a tapered roller bearing according to a third embodiment of the present invention.

In the present embodiment, as illustrated in FIG. 11, an axial extension 3e extending in an axial direction is provided at a front-side (small diameter-side) end of the inner ring 3. A clearance groove 3d is formed between an inner ring raceway surface 3a and an outer circumferential surface of the axial extension 3e. An axial extension 2b extending in an axial direction is also provided at a front-side (large diameter-side) end of the outer ring 2. A clearance groove 2c is formed between an outer ring raceway surface 2a and an inner circumferential surface of the axial extension 2b.

By providing these axial extensions 2b and 3e, mounting and positioning characteristics when the bearing is assembled to an apparatus can be improved, and axial lengths of bearing rings can be increased. Thus, assemblability to a shaft or a housing can be improved.

Other configurations and operations are the same as in the second embodiment.

In the present embodiment, the axial extensions 2b and 3e are provided on both the inner and outer rings 2 and 3.

However, the axial extension may be configured to be provided on only any one of the inner and outer rings 2 and 3.

Fourth Embodiment

Next, a tapered roller bearing according to a fourth embodiment of the present invention will be described in detail with reference to FIGS. 12 to 13. Portions identical or equivalent to those of the first embodiment will be given identical reference signs, and description thereof will be omitted or simplified.

Figure 12A:
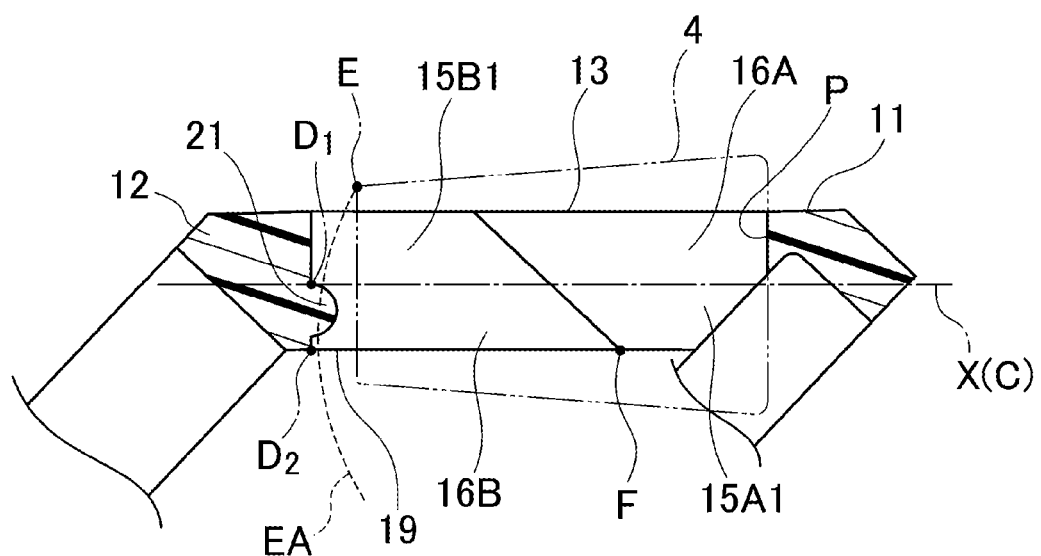
FIGS. 12A and 12B are sectional views of a tapered roller bearing according to a fourth embodiment of the present invention.
Figure 12B:
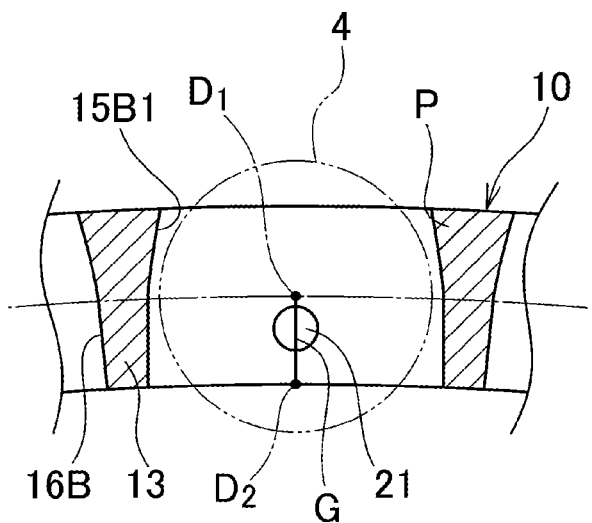
Figure 13:
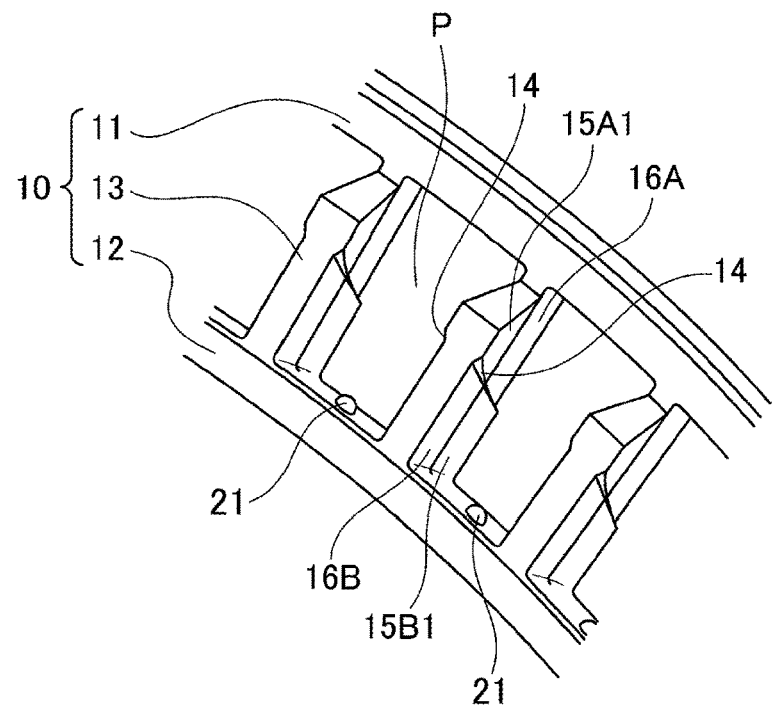
FIG. 13 is an enlarged sectional view illustrating key parts of the resin cage for the tapered roller bearing of FIGS. 12A and 12B.

As illustrated in FIGS. 12A to 13, in this embodiment, oblique planes 15A1 that are in sliding contact with the outer circumferential surface of the tapered roller 4 are formed closer to the inner diameter-side portions than the virtual conical plane C, which connects the rotation axes X (central axes) of the plurality of tapered rollers 4, 4, . . . , on the inner diameter side of the pocket P on the facing surfaces of the neighboring pillar parts 13 and 13 of the cage 10, and radial planes 16A continuous with the oblique planes 15A1 are formed closer to the outer diameter-side portions than the virtual conical plane C. In addition, oblique planes 15B1 that are in sliding contact with the outer circumferential surface of the tapered roller 4 are formed closer to the outer diameter-side portions than the virtual conical plane C on the outer diameter side of the pocket P on the facing surfaces of the neighboring pillar parts 13 and 13, and radial planes 16B continuous with the oblique planes 15B1 are formed closer to the inner diameter-side portions than the virtual conical plane C.

The oblique planes 15A1 and 15B1 are inclined inside the pocket P in a circumferential direction beyond the radial planes 16A and 16B. For this reason, the portions of the pillar parts 13 constituting the oblique planes 15A1 and 15B1 are formed in a tapered shape in which they are tapered inward in a radial direction.

In the present embodiment, the neighboring pillar parts 13 constitute a second engagement allowance in which the outer diameter-side opening width of the pocket P becomes smaller than a roller diameter at a position of the opening width in a direction of the rotation axis X of the tapered roller 4 by means of the oblique planes 15B1 on the outer diameter side of the pocket P. In addition, the neighboring pillar parts 13 constitute a first engagement allowance in which the inner diameter-side opening width of the pocket P becomes smaller than a roller diameter at a position of the opening width in the direction of the rotation axis X of the tapered roller 4 by means of the oblique planes 15A1 on the inner diameter side of the pocket P.

That is, in the present embodiment, the oblique planes 15A1 on the inner diameter side of the pocket P are continuously formed up to the inner circumferential surfaces of the pillar parts 13, and the oblique planes 15A1 constitute a first protrusion that retains the tapered roller 4 on the inner diameter side of the pocket P. In addition, the oblique planes 15B1 on the outer diameter side of the pocket P are continuously formed up to the outer circumferential surfaces of the pillar parts 13, and the oblique planes 15B1 constitute a second protrusion that retains the tapered roller 4 on the outer diameter side of the pocket P.

Accordingly, at least a part of each of the pillar parts 13 that constitute the first engagement allowance on the inner diameter side of the pocket P and at least a part of each of the pillar parts 13 that constitute the second engagement allowance on the outer diameter side of the pocket P have tapered shapes.

In the pockets P, bumps 21 are formed on the inner surface of the small diameter ring part 12. Meanwhile, the small diameter-side end faces of the tapered rollers 4 which face the bumps 21 are formed to be a substantially flat surface.

Apexes of the bumps 21 are located on the rotation axes X of the tapered rollers 4, but they may be offset and located from the rotation axes X of the tapered rollers 4.

As illustrated in FIGS. 12A and 12B, if the bump 21 is provided at an intersection D1 with the rotation axis X (the central axis) of the tapered roller 4 on the inner surface of the small diameter ring part 12, when the bearing rotates, torque is small because the bump 21 does not obstruct a rotation motion of the tapered roller 4.

When an intersection E between the small diameter-side end face of the roller and the outer circumferential surface of the roller approaches the inner surface of the small diameter ring part 12 of the cage first when the tapered roller falls off, if the bump 21 is provided at a facing position D2 of the small diameter ring part 12 which faces the intersection E in the direction of the rotation axis, an effect of preventing falling when the tapered roller 4 falls off from the cage 10 is most excellent. The intersection E rotates about an apex F of a ridgeline of the first engagement allowance.

Therefore, as a result of considering both rotation and assembly of the bearing, the apex of the bump 21 is preferably provided closer to an inner diameter-side opening 19 of the pocket P than a position through which the rotation axis X of the tapered roller 4 passes on the inner surface of the small diameter ring part 12. Further, the apex of the bump 21 is more preferably provided between the intersection D1 and the facing position D2 facing the intersection E (that is, on a straight line G connected between D1 and D2) on the inner surface of the small diameter ring part of the cage.

However, since the bump 21 of the present embodiment has a substantially spherical shape, the apex of the bump 21 is on an outer diameter side beyond the facing position D2.

The bump 21 is formed at a middle position of the pocket P in a circumferential direction on the inner surface of the small diameter ring part 12.

Further, a size of the bump 21 is also designed in consideration of both the rotation and the assembly of the bearing. That is, a height of the bump 21 in the direction of the rotation axis X is designed such that the tapered roller 4 rotates in a state in which the tapered roller 4 is retained in the cage 10 and intersects a locus EA (see FIG. 12A) drawn by edges (the intersection E) of the small diameter-side end face of the roller and the outer circumferential surface of the roller. In addition, the height of the bump 21 in the direction of the rotation axis X is designed such that a predetermined pocket gap is secured between the bump 21 and the small diameter-side end face of the tapered roller 4.

Accordingly, the tapered roller bearing 1 of the present embodiment also has a cage and roller structure with a simple configuration in which the bumps 21 are provide on the cage 10 while being configured to retain each of the tapered rollers 4 by the first and the second engagement allowances on the outer and inner diameter sides of each of the pockets P. That is, the bump 21 and the small diameter-side tail of the tapered roller 4 can be brought into contact with each other, the oblique planes 15A1 on the large ring side can be made to retain the large diameter-side head of the tapered roller 4, and the rotation of the small diameter-side tail of the tapered roller 4 in a tilt direction can be restrained, so that the falling of the tapered roller 4 from the cage 10 can be reliably prevented.

Other configurations and operations are the same as in the first embodiment.

The cage 10 having shapes of the facing surfaces of the pillar parts 13 and 13 of the present embodiment can be applied in combination with the tapered roller 4 having the recess 4a in the end face of the second embodiment.

The present invention is not limited to the aforementioned embodiments, and is appropriately made possible modifications, improvements, and so on. Each of the embodiments can be substantially combined within a range within which it can be carried out.

In the shape of the tapered roller bearing of each of the embodiment of the present invention, in the specification in which the bearing size having a small diameter-side diameter of the roller of 10 mm or less is relatively small, the effect of preventing the falling of the roller is high.

In addition, "the substantially flat surface in the first radial direction" and "the substantially flat surface in the second radial direction" in the present invention are not limited to the flat surfaces extending in the radial direction or the flat surfaces along which the facing surfaces of the neighboring pillar parts are parallel to each other, may be flat surfaces directed in the radial direction within a range in which they can be molded by axial drawing, are not limited to the flat surfaces represented in the present embodiment, and may be formed by a combination of a flat surface with a curved surface having a small curvature or a curved surface.

In the present embodiment, the contact angle α of the roller bearing is set to a sharp gradient of 35° to 55°, but it is not limited thereto. However, in the roller bearing of this sharp gradient, the bumps are provided on the cage, so that the falling of the tapered rollers from the cage can be effectively prevented.

Further, in the present embodiment, the material of the cage is the resin. However, the material of the cage of the present invention is optional.

In the present embodiment, the cage is manufactured by injection molding, but it is not limited thereto. The cage may be manufactured by a 3D printer having a high degree of freedom for design.

In addition, the facing surfaces of the pillar parts 13 for forming the pockets of the cage of the present invention are not limited to the present embodiment as long as they constitute the first engagement allowance and the second engagement allowance. For example, the facing surfaces of the pillar parts 13 may be made up of the inner diameter-side conical surfaces 15A, the outer diameter-side conical surfaces 15B, the radial planes 16A, the radial planes 16B, and the protrusions 17A and 17B like the first embodiment, may be made up of the oblique planes 15A1 and 15B1, the radial planes 16A, and the radial plane 16B like the fourth embodiment, and may have other configurations. For example, like the fourth embodiment, the portions of the pillar parts constituting the first and second engagement allowances may be formed in the tapered shape, that is, be the conical surfaces 15A and 15B and the oblique planes 15A1 and 15B1. The protrusions 17A and 17B may also be formed in an arbitrary shape, and for instance in a curved shape or in a platform shape.

Figure 14:
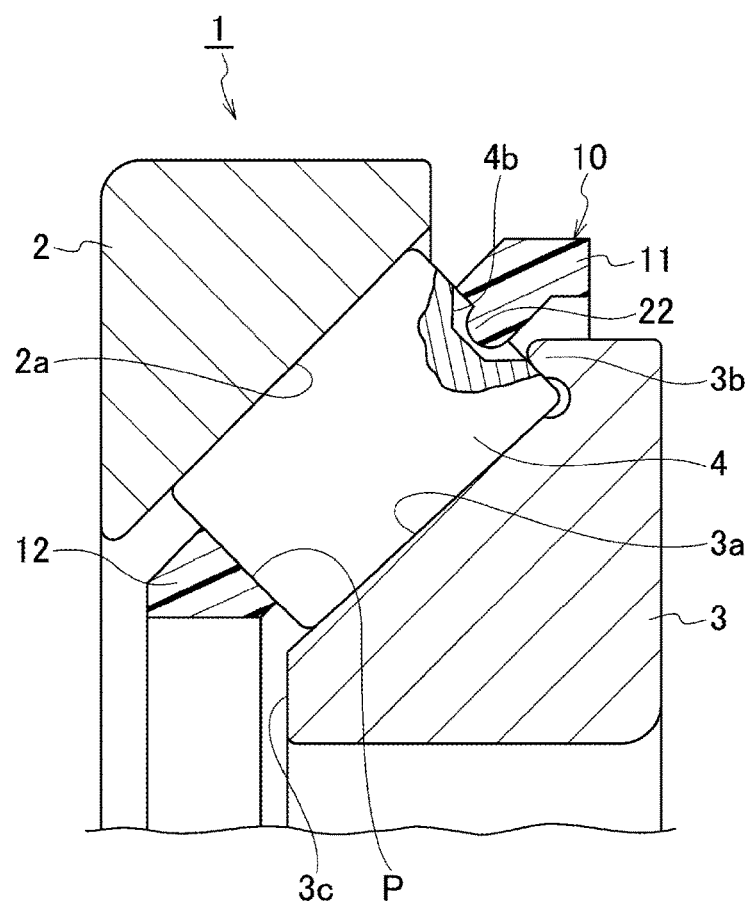
FIG. 14 is a sectional view of a tapered roller bearing according to a reference example of the present invention.
Figure 15:
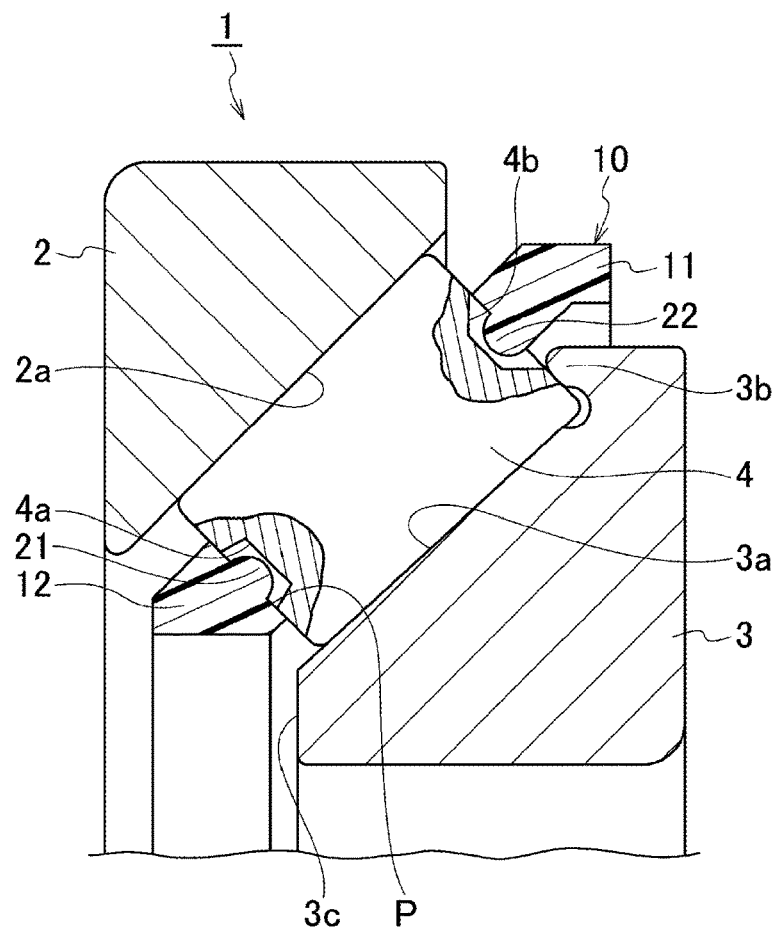
FIG. 15 is a sectional view of a tapered roller bearing according to another reference example of the present invention.
Figure 16:
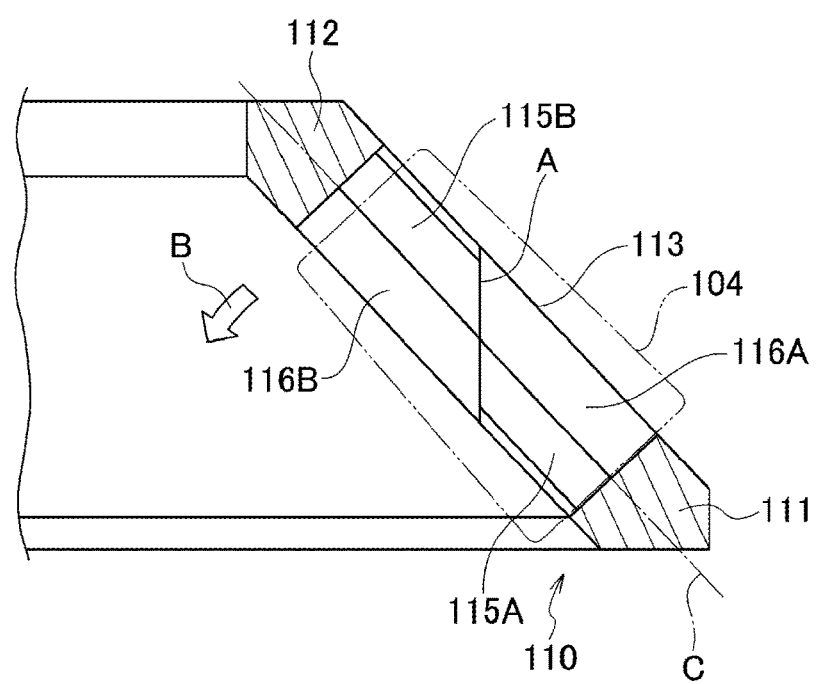
FIG. 16 is an explanatory view relevant to a state in which a tapered roller and a cage for a conventional tapered roller bearing are assembled.

FIGS. 14 and 15 illustrate a tapered roller bearing according to a reference example of the present invention.

In the tapered roller bearing illustrated in FIG. 14, a recess 4b is formed in a large diameter-side end face of a tapered roller 4, and a bump 22 is formed on an inner surface of a large diameter ring part 11. In the tapered roller bearing illustrated in FIG. 15, recesses 4a and 4b are respectively formed in small and large diameter-side end faces of a tapered roller 4, and bumps 21 and 22 are respectively formed on an inner surface of a small diameter ring part 12 and on an inner surface of a large diameter ring part 11.

In the tapered roller bearing illustrated in FIG. 14, falling of the tapered roller due to rotation of a small diameter-side tail of the tapered roller in a tilt direction can be effectively prevented by only the recess 4b formed in the large diameter-side end face of the tapered roller 4.

In the tapered roller bearing illustrated in FIG. 15, as described in the above embodiments, the recess 4a has a function of effectively preventing falling of the tapered roller due to rotation of a small diameter-side tail of the tapered roller in a tilt direction. On the other hand, the recess 4b does not have the function of effectively preventing the falling of the tapered roller, and is not favorable in terms of production costs.

This application is based on Japanese Patent Application Nos. 2015-185480 and 2015-230117, filed on Sep. 18, 2015 and Nov. 25, 2015, the contents of which are incorporated herein by reference.

DESCRIPTION OF REFERENCE NUMERALS AND SIGNS

1 Tapered roller bearing
2 Outer ring
2a Outer ring raceway surface
3 Inner ring
3a Inner ring raceway surface
3b Large flange (flange part)
4 Tapered roller
10 Resin cage for tapered roller bearing
11 Large diameter ring part
12 Small diameter ring part
13 Pillar part
14 Recessed groove
15A Inner diameter-side conical surface, first conical surface
15B Outer diameter-side conical surface, second conical surface
16A Radial plane (substantially flat surface in first radial direction)
16B Radial plane (substantially flat surface in second radial direction)
17A Protrusion (first protrusion)
17B Protrusion (second protrusion)
20 Cutout part
21 Bump
A, A' Mold parting line
B Inner ring width
C Virtual conical plane connecting rotation axis of tapered roller
Lw Roller length
P Pocket
T Assembly width
α Contact angle
α2 Cage tilt angle

The invention claimed is:
1. A tapered roller bearing comprising:
an outer ring having an outer ring raceway surface on an inner circumferential surface thereof;
an inner ring having an inner ring raceway surface on an outer circumferential surface thereof;
a plurality of tapered rollers that are rollingly arranged between the outer ring raceway surface and the inner ring raceway surface; and a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers, the inner ring including a large diameter-side end and a small diameter-side end, and only the large diameter-side end being formed with a flange part, wherein:

each of the pillar parts includes a first protrusion that retains each of the tapered rollers on an inner diameter side of each of the pockets and a second protrusion that retains each of the tapered rollers on an outer diameter side of each of the pockets;

bumps are formed on only an inner surface of the small diameter ring part in the pockets;

end faces of the tapered rollers facing the bumps are substantially flat surfaces or recesses; and apexes of the bumps are provided closer to inner diameter-side openings of the pockets than positions through which the rotation axes of the tapered rollers pass on the inner surface of the small diameter ring part.

2. The tapered roller bearing according to claim 1, wherein the first and second protrusions are arranged at positions at which the protrusions do not overlap each other in the axial direction.

3. The tapered roller bearing according to claim 1, wherein the cage has a ring-like cutout part formed on at least one of an inner circumferential surface of the large diameter ring part and an outer circumferential surface of the small diameter ring part such that a thickness of the ring part is thinner than thicknesses of the pillar parts.

4. A tapered roller bearing comprising:

an outer ring having an outer ring raceway surface on an inner circumferential surface thereof;

an inner ring having an inner ring raceway surface on an outer circumferential surface thereof;

a plurality of tapered rollers that are rollingly arranged between the outer ring raceway surface and the inner ring raceway surface; and a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers, the inner ring including a large diameter-side end and a small diameter-side end, and only the large diameter-side end being formed with a flange part, wherein:

the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets;

the neighboring pillar parts constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets;

bumps are formed on an inner surface of the small diameter ring part in the pockets;

end faces of the tapered rollers facing the bumps are substantially flat surfaces; and apexes of the bumps are provided closer to inner diameter-side openings of the pockets than positions through which the rotation axes of the tapered rollers pass on the inner surface of the small diameter ring part.

5. The tapered roller bearing according to claim 4, wherein at least a part of each of the pillar parts that constitute the first engagement allowance on the inner diameter side of each of the pockets and at least a part of each of the pillar parts that constitute the second engagement allowance on the outer diameter side of each of the pockets are arranged at positions that do not overlap each other in the axial direction.

6. The tapered roller bearing according to claim 4, wherein at least a part of each of the pillar parts that constitute the first engagement allowance on the inner diameter side of each of the pockets and at least a part of each of the pillar parts that constitute the second engagement allowance on the outer diameter side of each of the pockets have tapered shapes.

7. The tapered roller bearing according to claim 4, wherein the cage has a ring-like cutout part formed on at least one of an inner circumferential surface of the large diameter ring part and an outer circumferential surface of the small diameter ring part such that a thickness of the ring part is thinner than thicknesses of the pillar parts.

8. A tapered roller bearing comprising:

an outer ring having an outer ring raceway surface on an inner circumferential surface thereof;

an inner ring having an inner ring raceway surface on an outer circumferential surface thereof;

a plurality of tapered rollers that are rollingly arranged between the outer ring raceway surface and the inner ring raceway surface; and a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers, the inner ring including a large diameter-side end and a small diameter-side end, and only the large diameter-side end being formed with a flange part, wherein:

the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets;

the neighboring pillar parts constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets;

recesses are formed in small diameter-side end faces of the tapered rollers;

bumps protruding to enter the recesses are formed in an inner surface of the small diameter ring part in the pockets; and apexes of the bumps are provided closer to inner diameter-side openings of the pockets than positions through which the rotation axes of the tapered rollers pass on the inner surface of the small diameter ring part.

9. The tapered roller bearing according to claim 8, wherein
at least a part of each of the pillar parts that constitute the first engagement allowance on the inner diameter side of each of the pockets and at least a part of each of the pillar parts that constitute the second engagement allowance on the outer diameter side of each of the pockets are arranged at positions that do not overlap each other in the axial direction.

10. The tapered roller bearing according to claim 8, wherein
at least a part of each of the pillar parts that constitute the first engagement allowance on the inner diameter side of each of the pockets and at least a part of each of the pillar parts that constitute the second engagement allowance on the outer diameter side of each of the pockets have tapered shapes.

11. The tapered roller bearing according to claim 8, wherein:
each of the bumps has a conical shape or a spherical shape; and
each of the bumps is formed such that, out of the inner surface of the small diameter ring part, the inner surface other than the bump does not overlap the bump when viewed in the axial direction.

12. The tapered roller bearing according to claim 8, wherein
the cage has a ring-like cutout part formed on at least one of an inner circumferential surface of the large diameter ring part and an outer circumferential surface of the small diameter ring part such that a thickness of the ring part is thinner than thicknesses of the pillar parts.

13. A tapered roller bearing comprising:
an outer ring having an outer ring raceway surface on an inner circumferential surface thereof;
an inner ring having an inner ring raceway surface on an outer circumferential surface thereof;
a plurality of tapered rollers that are rollingly arranged between the outer ring raceway surface and the inner ring raceway surface; and
a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers,
the inner ring including a large diameter-side end and a small diameter-side end, and only the large diameter-side end being formed with a flange part, wherein:
each of the pillar parts includes a first protrusion that retains each of the tapered rollers on an inner diameter side of each of the pockets and a second protrusion that retains each of the tapered rollers on an outer diameter side of each of the pockets;
bumps are formed on only an inner surface of the small diameter ring part in the pockets;
end faces of the tapered rollers facing the bumps are substantially flat surfaces or recesses;
mold parting lines extending in the axial direction are formed at each of the pillar parts having the pockets; and
the first protrusion is disposed on an outer diameter side with respect to each of the mold parting lines, and the second protrusion is disposed on an inner diameter side with respect to each of the mold parting lines.

14. A tapered roller bearing comprising:
an outer ring having an outer ring raceway surface on an inner circumferential surface thereof;
an inner ring having an inner ring raceway surface on an outer circumferential surface thereof;
a plurality of tapered rollers that are rollingly arranged between the outer ring raceway surface and the inner ring raceway surface; and
a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers,
the inner ring including a large diameter-side end and a small diameter-side end, and only the large diameter-side end being formed with a flange part, wherein:
each of the pillar parts includes a first protrusion that retains each of the tapered rollers on an inner diameter side of each of the pockets and a second protrusion that retains each of the tapered rollers on an outer diameter side of each of the pockets;
bumps are formed on only an inner surface of the small diameter ring part in the pockets;
end faces of the tapered rollers facing the bumps are substantially flat surfaces or recesses;
mold parting lines extending in the axial direction are formed at each of the pillar parts having the pockets;
first conical surfaces that are in sliding contact with the outer circumferential surface of each of the tapered rollers are formed closer to outer diameter sides than the mold parting lines on facing surfaces of the neighboring pillar parts, and substantially flat surfaces that are continuous with the first conical surfaces in a first radial direction are formed closer to outer diameter-side portions than the first conical surfaces; and
second conical surfaces that are in sliding contact with the outer circumferential surface of each of the tapered rollers are formed closer to inner diameter sides than the mold parting lines, and substantially flat surfaces that are continuous with the second conical surfaces in a second radial direction are formed closer to inner diameter-side portions than the second conical surfaces.

15. A tapered roller bearing comprising:
an outer ring having an outer ring raceway surface on an inner circumferential surface thereof;
an inner ring having an inner ring raceway surface on an outer circumferential surface thereof;
a plurality of tapered rollers that are rollingly arranged between the outer ring raceway surface and the inner ring raceway surface; and
a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers,
the inner ring including a large diameter-side end and a small diameter-side end, and only the large diameter-side end being formed with a flange part, wherein:
the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets;

the neighboring pillar parts constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets;

bumps are formed on an inner surface of the small diameter ring part in the pockets;

end faces of the tapered rollers facing the bumps are substantially flat surfaces;

mold parting lines extending in the axial direction are formed at each of the pillar parts having the pockets;

first conical surfaces that are in sliding contact with the outer circumferential surface of each of the tapered rollers are formed closer to outer diameter sides than the mold parting lines on facing surfaces of the neighboring pillar parts, and substantially flat surfaces that are continuous with the first conical surfaces in a first radial direction are formed closer to outer diameter-side portions than the first conical surfaces; and second conical surfaces that are in sliding contact with the outer circumferential surface of each of the tapered rollers are formed closer to inner diameter sides than the mold parting lines, and substantially flat surfaces that are continuous with the second conical surfaces in a second radial direction are formed closer to inner diameter-side portions than the second conical surfaces.

16. A tapered roller bearing comprising:
an outer ring having an outer ring raceway surface on an inner circumferential surface thereof;
an inner ring having an inner ring raceway surface on an outer circumferential surface thereof;
a plurality of tapered rollers that are rollingly arranged between the outer ring raceway surface and the inner ring raceway surface; and
a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers,
the inner ring including a large diameter-side end and a small diameter-side end, and only the large diameter-side end being formed with a flange part, wherein:
the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets;
the neighboring pillar parts constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets;
recesses are formed in small diameter-side end faces of the tapered rollers;

bumps protruding to enter the recesses are formed in an inner surface of the small diameter ring part in the pockets;

mold parting lines extending in the axial direction are formed at each of the pillar parts having the pockets;

first conical surfaces that are in sliding contact with the outer circumferential surface of each of the tapered rollers are formed closer to outer diameter sides than the mold parting lines on facing surfaces of the neighboring pillar parts, and substantially flat surfaces that are continuous with the first conical surfaces in a first radial direction are formed closer to outer diameter-side portions than the first conical surfaces; and second conical surfaces that are in sliding contact with the outer circumferential surface of each of the tapered rollers are formed closer to inner diameter sides than the mold parting lines, and substantially flat surfaces that are continuous with the second conical surfaces in a second radial direction are formed closer to inner diameter-side portions than the second conical surfaces.

17. A tapered roller bearing comprising:
an outer ring having an outer ring raceway surface on an inner circumferential surface thereof;
an inner ring having an inner ring raceway surface on an outer circumferential surface thereof;
a plurality of tapered rollers that are rollingly arranged between the outer ring raceway surface and the inner ring raceway surface; and
a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers,
the inner ring including a large diameter-side end and a small diameter-side end, and only the large diameter-side end being formed with a flange part, wherein:
each of the pillar parts includes a first protrusion that retains each of the tapered rollers on an inner diameter side of each of the pockets and a second protrusion that retains each of the tapered rollers on an outer diameter side of each of the pockets;
bumps are formed on only an inner surface of the small diameter ring part in the pockets;
end faces of the tapered rollers facing the bumps are substantially flat surfaces or recesses;
each of the bumps has a conical shape or a spherical shape; and
each of the bumps is formed such that, out of the inner surface of the small diameter ring part, the inner surface other than the bump does not overlap the bump when viewed in the axial direction.

18. A tapered roller bearing comprising:
an outer ring having an outer ring raceway surface on an inner circumferential surface thereof;
an inner ring having an inner ring raceway surface on an outer circumferential surface thereof;
a plurality of tapered rollers that are rollingly arranged between the outer ring raceway surface and the inner ring raceway surface; and
a cage formed in a shape in which a large diameter ring part and a small diameter ring part separated in an axial direction are connected by a plurality of pillar parts that are in sliding contact with outer circumferential surfaces of the tapered rollers, and having a plurality of pockets that house and retain the tapered rollers, the inner ring including a large diameter-side end and a small diameter-side end, and only the large diameter-side end being formed with a flange part, wherein:

the neighboring pillar parts constitute a first engagement allowance in which an inner diameter-side opening width of each of the pockets becomes smaller than a roller diameter at a position of the opening width in a direction of a rotation axis of each of the tapered rollers at at least a part of an inner diameter side of each of the pockets;

the neighboring pillar parts constitute a second engagement allowance in which an outer diameter-side opening width of each of the pockets becomes smaller than the roller diameter at a position of the opening width in the direction of the rotation axis of each of the tapered rollers at at least a part of an outer diameter side of each of the pockets;

bumps are formed on an inner surface of the small diameter ring part in the pockets;

end faces of the tapered rollers facing the bumps are substantially flat surfaces;

each of the bumps has a conical shape or a spherical shape; and each of the bumps is formed such that, out of the inner surface of the small diameter ring part, the inner surface other than the bump does not overlap the bump when viewed in the axial direction.

* * * * *